US007874369B2

(12) United States Patent
Parker et al.

(10) Patent No.: US 7,874,369 B2
(45) Date of Patent: Jan. 25, 2011

(54) PROGRESSIVE CAVITY PUMP (PCP) DRIVE HEAD STUFFING BOX WITH SPLIT SEAL

(75) Inventors: Charles D. Parker, Sugar Land, TX (US); William C. Lane, The Woodlands, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 377 days.

(21) Appl. No.: 11/531,567

(22) Filed: Sep. 13, 2006

(65) Prior Publication Data
US 2008/0122182 A1   May 29, 2008

(51) Int. Cl.
E21B 19/00   (2006.01)

(52) U.S. Cl. ............ 166/379; 166/84.1; 166/68.5; 277/329

(58) Field of Classification Search .......... 166/68.5, 166/68, 84.1, 84.5, 379; 277/326, 364, 358, 277/365, 361, 369, 329, 511
See application file for complete search history.

(56) References Cited

U.S. PATENT DOCUMENTS

| 4,094,513 | A |   | 6/1978  | Kime et al. |
|-----------|---|---|---------|-------------|
| 4,227,543 | A |   | 10/1980 | Williams, Jr. |
| 4,509,762 | A | * | 4/1985  | Garrett ............... 277/398 |
| 5,370,401 | A |   | 12/1994 | Sandgren |
| 5,529,315 | A |   | 6/1996  | Borrino et al. |
| 5,571,268 | A |   | 11/1996 | Azibert |
| 5,863,047 | A |   | 1/1999  | Ellis |
| 6,113,355 | A |   | 9/2000  | Hult et al. |
| 6,358,027 | B1 |  | 3/2002  | Lane |
| 6,367,809 | B1 |  | 4/2002  | Weehunt |
| 6,485,023 | B2 | * | 11/2002 | Budrow et al. ............... 277/370 |
| 6,485,024 | B1 |  | 11/2002 | Pippert et al. |
| 6,832,123 | B2 | * | 12/2004 | Bjornson et al. ............... 700/98 |
| 6,843,313 | B2 |  | 1/2005  | Hult |
| 2004/0188944 | A1 | * | 9/2004 | Bjornson ............... 277/370 |
| 2004/0201176 | A1 |   | 10/2004 | Bjornson |
| 2005/0011642 | A1 |   | 1/2005  | Hult |
| 2005/0045323 | A1 |   | 3/2005  | Hult |

(Continued)

FOREIGN PATENT DOCUMENTS

CA    2 347 613    2/2002

(Continued)

OTHER PUBLICATIONS

U.K. Search Report, Application No. GB0717804.9, dated Dec. 18, 2007.

(Continued)

*Primary Examiner*—William P Neuder
*Assistant Examiner*—David Andrews
(74) *Attorney, Agent, or Firm*—Patterson & Sheridan, LLP

(57) ABSTRACT

The present invention relates to a split seal for a progressive cavity pump (PCP) drive head stuffing box. In one embodiment, a mechanical seal assembly for a pump is provided. The mechanical seal assembly includes a seal housing; first and second semi-annular mechanical seals, each at least partially disposed in the seal housing bore, and a seal sleeve rotatable relative to the seal housing; third and fourth semi-annular mechanical seals, each disposed at least partially in the seal sleeve bore, at least one of the third and fourth seals rotationally coupled to the seal sleeve; and one or more biasing members biasing the mechanical seals into engagement.

35 Claims, 14 Drawing Sheets

U.S. PATENT DOCUMENTS

2006/0032635 A1    2/2006    Rivard
2006/0082069 A1    4/2006    Malavazi

FOREIGN PATENT DOCUMENTS

| EP | 1 348 897 | 10/2003 |
|---|---|---|
| GB | 2 316 721 | 3/1998 |
| GB | 2 361 966 | 11/2001 |

OTHER PUBLICATIONS

Mechanical Seals Catalog, UTEX Industries, Inc. (Date Unknown).

U-PAK® Injectable Pump & Valve Sealant, UTEX Industries, Inc. (Date Unknown).

EnvirAlign™, Advantage Products, Inc. (Date Unknown).

Mechanical Seal Hard Face Materials, The McNally Institute, http://www.mcnallyinstitute.com/Charts/Hard_ Faces.html, date printed Aug. 29, 2006.

GB Search Report, Application No. GB0717804.9, dated Mar. 26, 2008.

Canadian Office Action, Application No. 2,601,492, dated May 19, 2009.

GB Examination Report for GB Application No. GB0717804.9 dated Oct. 26, 2010.

\* cited by examiner

PROGRESSIVE CAVITY PUMP (PCP) DRIVE HEAD STUFFING BOX WITH SPLIT SEAL

BACKGROUND OF THE INVENTION

1. Field of the Invention

The present invention relates to a split seal for a progressive cavity pump (PCP) drive head stuffing box.

2. Description of the Related Art

FIG. 1 illustrates a known progressing cavity pump (PCP) system 10 installed over a wellbore 2. The wellbore 2 is partially lined with casing 4 which is cemented 5 to an inner surface of the wellbore 2. The wellbore 2 extends into a hydrocarbon-bearing formation 7, such as a crude oil formation. The system 10 includes a typical progressing cavity pump drive head 12, a wellhead frame 14, a stuffing box 16, an electric motor 18, and a belt and sheave drive system 20, all mounted on a flow tee 22. Alternatively, the drive system 20 may be gear driven. The flow tee 22 is shown with a blow out preventer 24 which is, in turn, mounted on a wellhead 25. The drive head supports and drives a drive shaft 26, generally known as a "polished rod". The polished rod 26 is supported and rotated by a polish rod clamp 28, which engages an output shaft 30 of the drive head by milled slots (not shown) in both parts. Wellhead frame 14 is open sided in order to expose polished rod 26 to allow a service crew to install a safety clamp on the polished rod and then perform maintenance work on stuffing box 16. Polished rod 26 rotationally drives a drive string 32, which, in turn, drives a progressing cavity pump 34.

Typically, the drive string 32 is a sucker rod string. Alternatively, the drive string may be a continuous rod (COROD) string, a coiled tubing string, or a jointed tubing string. The pump 34 has a stator 44a,b (see FIGS. 1A,B) coupled to production tubing 6 and a rotor 46 (see FIGS. 1A,B) coupled to the drive string 32. The pump 34 is located at the bottom of the wellbore 2 to produce well fluids to the surface, via the production tubing 6, through the wellhead. Stuffing box 16 is mounted below the drive head 12 and mounted in the wellhead frame 14 such that it can be serviced from below the drive head 12 without removing it. This necessitates mounting the drive head higher, constrains the design, and means a difficult service job.

FIG. 1A is a sectional view of the prior art PC pump 34a. Pump housing 42 contains an elastomeric stator 44a having multiple lobes 55 formed in an inner surface thereof. The pump housing 42 is usually made from metal, preferably steel. The stator 44a has five lobes 55, although the stator may have two or more lobes. Inside the stator 44a is a rotor 46, the rotor 46 having one lobe fewer than the stator 44a formed in an outer surface thereof. The inner surface of the stator 44a and the outer surface of the rotor 46 also twist along respective longitudinal axes, thereby each forming a substantially helical-hypocycloid shape. The rotor 46 is usually made from metal, preferably steel. The rotor 46 and stator 44a interengage at the helical lobes to form a plurality of sealing surfaces 60. Sealed chambers 47 between the rotor 46 and stator 44a are also formed. In operation, rotation of the sucker rod or COROD string causes the rotor 46 to nutate or precess within the stator 44a as a planetary gear would nutate within an internal ring gear, thereby pumping production fluid through the chambers 47. The centerline of the rotor 46 travels in a circular path around the centerline of the stator 44a.

One drawback in such prior art motors is the stress and heat generated by the movement of the rotor 46 within the stator 44a. There are several mechanisms by which heat is generated. The first is the compression of the stator elastomer 44a by the rotor 46, known as interference. Radial interference, such as five-thousandths of an inch to thirty-thousandths of an inch, is provided to seal the chambers to prevent leakage. The sliding or rubbing movement of the rotor 46 combined with the forces of interference generates friction. In addition, with each cycle of compression and release of the elastomer 44a, heat is generated due to internal viscous friction among the elastomer molecules. This phenomenon is known as hysteresis. Cyclic deformation of the elastomer occurs due to three effects: interference, centrifugal force, and reactive forces from pumping. The centrifugal force results from the mass of the rotor moving in the nutational path previously described. Reactive forces from torque generation are similar to those found in gears that are transmitting torque. Additional heat input may also be present from the high temperatures downhole.

Because elastomers are poor conductors of heat, the heat from these various sources builds up in the thick sections 50a-e of the stator lobes 55. In these areas the temperature rises higher than the temperature of the circulating fluid or the formation. This increased temperature causes rapid degradation of the elastomer 44a. Also, the elevated temperature changes the mechanical properties of the elastomer 44a, weakening each of the stator lobes as a structural member and leading to cracking and tearing of sections 50a-e, as well as portions 45a-e of the elastomer at the lobe crests. This design can also produce uneven rubber strain between the major and minor diameters of the pumping section. The flexing of the lobes 55 also limits the pressure capability of each stage of the pumping section by allowing more fluid slippage from one stage to the subsequent stages below.

Advances in manufacturing techniques have led to the introduction of even wall PC pumps 34b as shown in FIG. 1B. A thin tubular elastomer layer 70 is bonded to an inner surface of the stator 44b or an outer surface of the rotor 46 (layer 70 bonded on stator 44b as shown). The stator 44b is typically made from metal, preferably steel. These pumps 34b provide more power output than the traditional designs above due to the more rigid structure and the ability to transfer heat away from the elastomer 70 to the stator 44b. With improved heat transfer and a more rigid structure, the new even wall designs operate more efficiently and can tolerate higher environmental extremes. Although the outer surface of the stator 44b is shown as round, the outer surface may also resemble the inner surface of the stator. Further, the rotor 46 may be hollow.

FIG. 1C is a sectional view of the prior art retrofit stuffing box 16r. The retrofit stuffing box 16r includes a housing that has a first portion 112ra and a second or base portion 112rb. The second or base portion 112rb of the housing underlies first portion 112ra and is joined to first potion 112ra by bolts 113. The second portion 112rb has apertures 115 adapted to receive screws or other securing devices for the purpose of mounting stuffing box 16r. The stuffing box 16r includes an internal sleeve 114 positioned within the first portion 112ra of the housing. A first bearing 116 and a second bearing 118 are positioned in an annular space 120 between internal sleeve 114 and 112ra of the housing, such that internal sleeve 114 is journalled for rotation within the first portion 112ra of the housing. First bearing 116 is positioned within a bearing sleeve 122. Thrust washer 128 carries a first seal 124 and second seal 126. First bearing 116 is separated from second bearing 118 by a bearing separator 130. Second bearing 118 engages a shoulder 119 that limits its movement within annular space 120. A snap ring 127 is positioned above thrust washer 128 that also limits movement within annular space 120. A leak cock 132 is provided on first portion 112ra of the housing for supplying lubricant to first bearing 116 and second bearing 118.

A shaft cap 134 and static seals 136 are positioned within internal sleeve 114 to engage the drive shaft 26. Bolts 140 are used to tighten a rod clamp 142 around the drive shaft 26 in order to prevent the drive shaft 26 from being withdrawn from internal sleeve 114.

Referring also to FIG. 1D, a mechanical seal 144 is disposed in annular space 120 between internal sleeve 114 and first portion 112ra of the housing to block the passage of produced well fluids into first bearing 116 and second bearing 118. Mechanical seal 144 has a first body 146 with a first sealing surface 150 and a second body 148 with a second sealing surface 156. First body 146 is secured by set screws 152 to and rotates with internal sleeve 114. An o-ring seal 154 is positioned between first body 146 and internal sleeve 114 and serves a static sealing function. Second body 148 is secured by pins 158 to and remains stationary with housing 110. Pins 158 project into travel grooves 160 in first portion 111 of housing 110 so as to permit second body 148 to travel axially along groove 160 relative to first portion 112ra of the housing. An o-ring seal 162 is provided between second body 148 and the first portion 112ra of the housing and serves a static sealing function.

Belville springs 164 are provided for biasing first sealing surface 150 and second sealing surface 156 in sealing engagement. A grease nipple 166 is provided on first portion 112ra of the housing for supplying lubricant to mechanical seal 144. A bushing 168 is provided between second portion 112rb of housing and the drive shaft 26.

Operation of the stuffing box 16r is as follows. The drive shaft 26 is prevented from being withdrawn from internal sleeve 114 by rod clamp 142 and bolts 140. During operation, internal sleeve 114 rotates the drive shaft 26. Rotational movement of internal sleeve 114 is accommodated by first bearing 116, second bearing 118, bushing 168 and thrust washer 128. Static seal 136 is positioned to prevent leakage between the drive shaft 26 and internal sleeve 114. Static seal 154 is positioned to prevent leakage between first body 146 and internal sleeve 114. Static seal 162 is positioned to prevent leakage between second body 148 and the first portion 112ra of the housing. Mechanical seal 144 is disposed in annular space 120 between internal sleeve 14 and the first portion 112ra of the housing to block the passage of produced well fluids into first bearing 116 and second bearing 118. Second sealing face 156 of second body 148 engages first sealing face 150 of first body 146 to form mechanical seal 144, thereby preventing any passage of produced well fluids. Spring 164 maintains the sealing faces engaged at all times, even as wear occurs.

The sealing system for stuffing box 16r, as described above, has very high pressure dynamic capability. It can operate at pressures at or above 3500 p.s.i. without leakage. At ambient temperatures, stuffing box 10 does not require any external cooling. For high temperature applications, external cooling can be added to stuffing box 16r.

FIG. 1E illustrates a typical progressing cavity pump drive head 12 with an integral stuffing box 16i mounted on the bottom of the drive head 12 and corresponding to that portion of the system in FIG. 1 which is above the dotted and dashed line 40. The integral stuffing box 16i reduces the height of the installation because there is no wellhead frame 14 and also reduces cost because there is no wellhead frame 14 and there are fewer parts since the stuffing box 16i is integrated with the drive head 12. The integral stuffing box is specially configured for a particular drive head 12 whereas the retrofit stuffing box is universal for any drive head 12.

FIG. 1F is a sectional view of the integral stuffing box 16i which includes a housing 112ia and an internal sleeve 114 positioned within housing 112. A first bearing 116, a second bearing 118, a thrust washer 128, and a bushing 168 are positioned in an annular space 120 between internal sleeve 114 and housing 112ia, such that internal sleeve 114 is journalled for rotation within housing 112. First bearing 116 is positioned within a bearing sleeve 122. Thrust washer 128 prevents axial movement of internal sleeve 114, so that internal sleeve 114 does not get pushed up out of position. Thrust washer 128 carries a first seal 124 and second seal 126. First bearing 116 is separated from second bearing 118 by a bearing separator 130. Second bearing 118 engages a shoulder 119 that limits its movement within annular space 120. A snap ring 127 is positioned above thrust washer 128 that also limits movement within annular space 120. A leak cock 132 is provided on housing 112 for supplying lubricant to first bearing 116 and second bearing 118.

A shaft cap 134 and static seals 136 are positioned within internal sleeve 114 to engage the drive shaft 26. Bolts 140 are used to tighten a rod clamp 142 around the drive shaft 26. Rod clamp 142 serves to preclude movement of internal sleeve 114 relative to the drive shaft 26. This ensures that internal sleeve 114 and the drive shaft 26 move as a unit and avoids relative movement that would cause wear of static seals 126.

Referring also to FIG. 1D, a mechanical seal 144 is disposed in annular space 120 between internal sleeve 114 and housing 112 to block the passage of produced well fluids into first bearing 116 and second bearing 118. A mechanical seal 144 has a first body 146 with a first sealing surface 150 and a second body 148 with a second sealing surface 156. First body 146 is secured to and rotates with internal sleeve 114. First body 146 secured to internal sleeve 114 with set screws 152. An o-ring seal 154 is positioned between first body 146 and internal sleeve 114 to serve a static sealing function. Second body 148 is secured to housing 112 by pins 158 and remains stationary with housing 112. Pin 158 projects into a travel groove 160 in housing 112ia so as to prevent rotation while permitting second body 148 to travel in groove 160 axially along housing 112ia. An o-ring seal 162 is provided between second body 148 and housing 112ia and serves a static sealing function.

Belville springs 164 are provided for biasing first sealing surface 150 and second sealing surface 156 in sealing engagement. A grease nipple 166 is provided on housing 112ia for supplying lubricant to mechanical seal 144. Apertures 115 are provided on top flange 112ib and bottom flange of housing 112ia for the purpose of mounting stuff box 16i.

PC pumps are typically used in deep well applications such as pumping oil from wells. These pumps are often used to produce heavy crude oil. Heavy crude oil is often produced from semi-consolidated sand formations. Loose sand is readily transported to the stuffing box by the viscosity of the crude oil. Due the abrasive sand particles present in the crude oil, premature failure of the stuffing box, particularly the mechanical seal, is common in these applications. The drive head 12 must be removed to do maintenance work on the conventional stuffing boxes 16i,r. This necessitates using a service rig with two lifting lines, one to support the drive shaft 26 and the other to support the drive head 12. This costs oil companies money in service time, down time and environmental clean up. Costs associated with stuffing box failures are one of the highest maintenance costs on many wells.

Another prior art design places the stuffing box above the drive head so that the stuffing box may be replaced without removing the drive head. However, this means that the stuffing box is at an increased elevation requiring more service time to reach the stuffing box and increasing the risk of injury to service personnel. Another prior art design uses injectable seal material. This is not a good solution as the seal material flows out of the seal gland and therefore must be maintained often.

Therefore, there exists a need in the art for a stuffing box for a PC pump system that may be easily repaired.

SUMMARY OF THE INVENTION

The present invention relates to a split seal for a progressive cavity pump (PCP) drive head stuffing box. In one embodiment, a mechanical seal assembly for a pump is provided. The mechanical seal assembly includes a seal housing having a longitudinal bore therethrough; first and second semi-annular mechanical seals, each at least partially disposed in the seal housing bore, and each having two radial faces, each radial face of each seal abutting a radial face of the other seal; a seal sleeve having a longitudinal bore therethrough and rotatable relative to the seal housing; third and fourth semi-annular mechanical seals, each disposed at least partially in the seal sleeve bore, each having two radial faces, each radial face of each seal abutting a radial face of the other seal, at least one of the third and fourth seals rotationally coupled to the seal sleeve; and one or more biasing members biasing longitudinal faces the first and second seals into engagement with longitudinal faces of the third and fourth annular seals or longitudinal faces the third and fourth seals into engagement with longitudinal faces of the first and second annular seals

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Unless otherwise specified and except for seals, all parts are made from an alloy, such as steel or stainless steel. Unless otherwise specified, all seals are made from a polymer, such as an elastomer or polyurethane (polyurethane may or may not be considered an elastomer, depending on the level of cross linking). The drive shaft 26 has been omitted for the sake of clarity. Use of the term coupling or attached herein includes direct and indirect coupling/attachment. For example, A is coupled/attached to C would include the case where A is directly coupled/attached to C and the case where A is directly coupled/attached to B which is directly coupled/attached to C.

Figures 1, 1E:
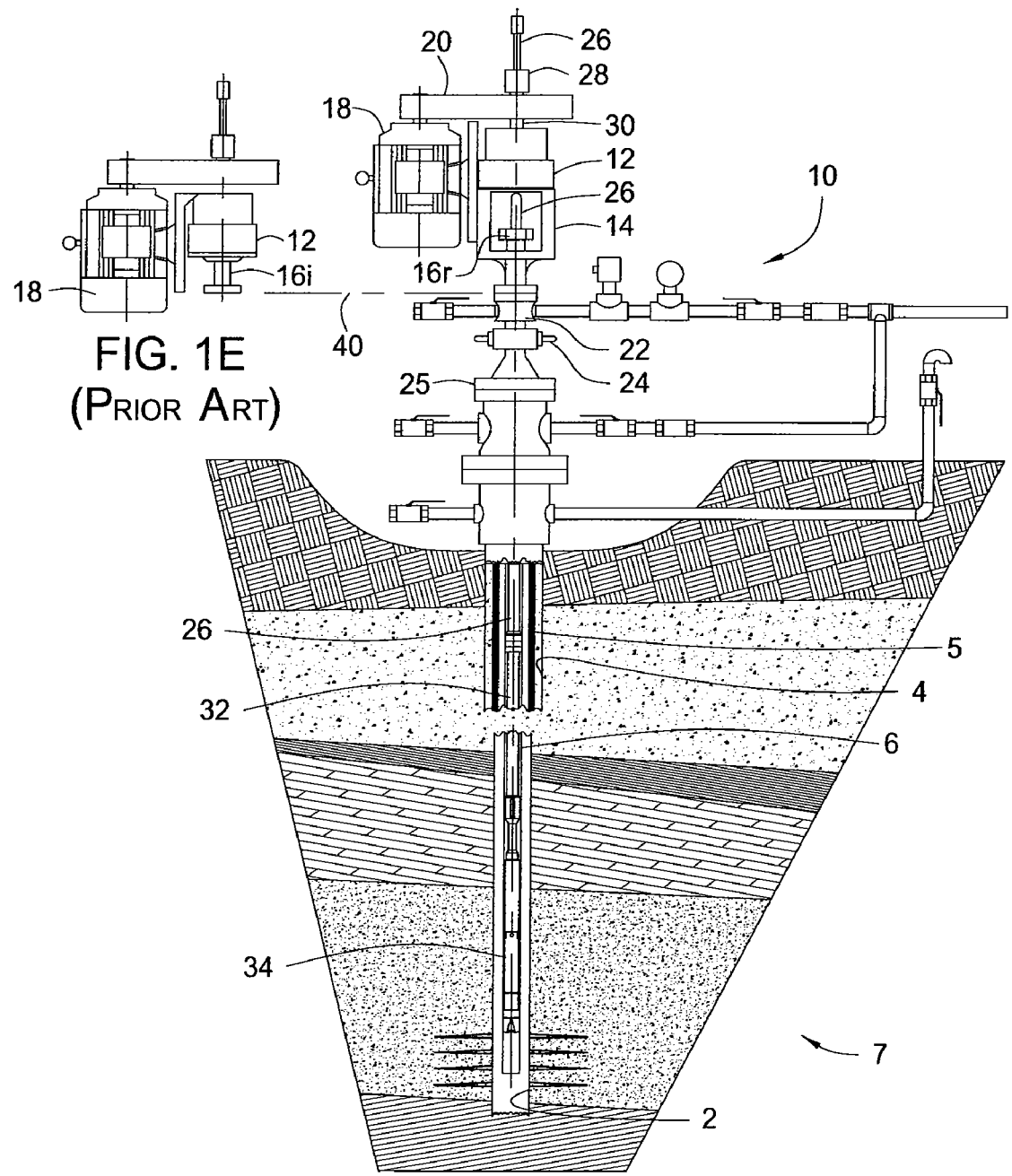
FIG. 1 is a view of a progressing cavity (PC) pump oil well installation in an earth formation with a typical drive head, wellhead frame and stuffing box.
FIG. 1E is a view similar to the upper end of FIG. 1 but illustrating a conventional drive head with an integrated stuffing box extending from the bottom end of the drive head.
Figure 1B:
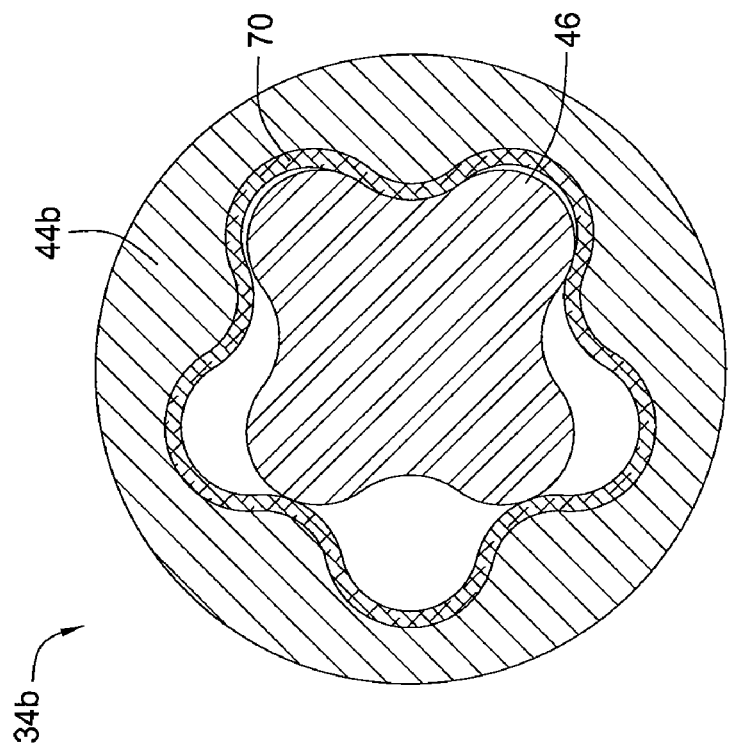
FIG. 1B is a sectional view of a prior art even wall PC pump.
Figure 1A:
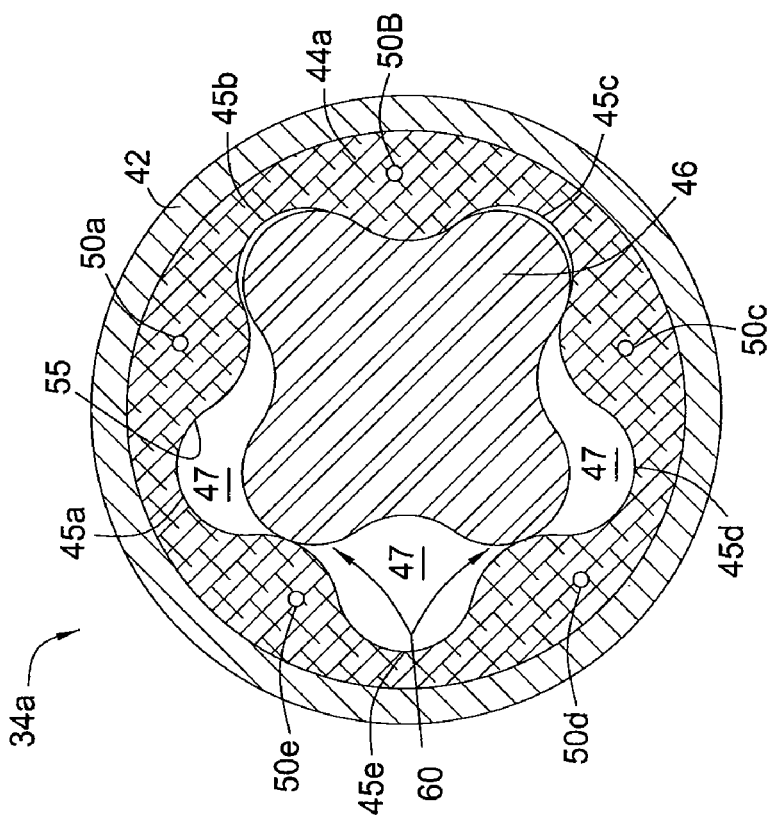
FIG. 1A is a sectional view of a prior art PC pump.
Figure 1C:
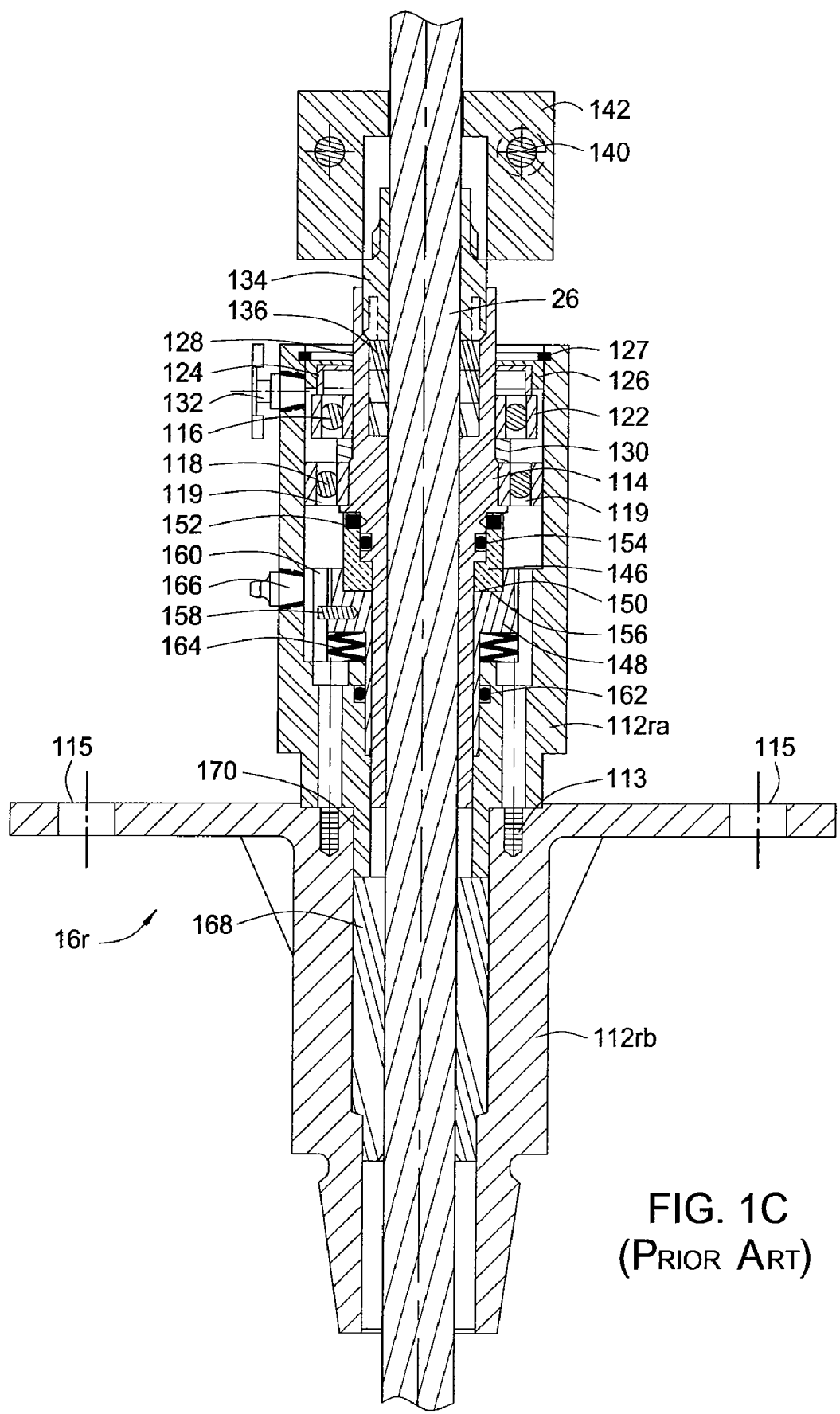
FIG. 1C is a side elevation view, in section, of a prior art retrofit stuffing box.
Figure 1D:
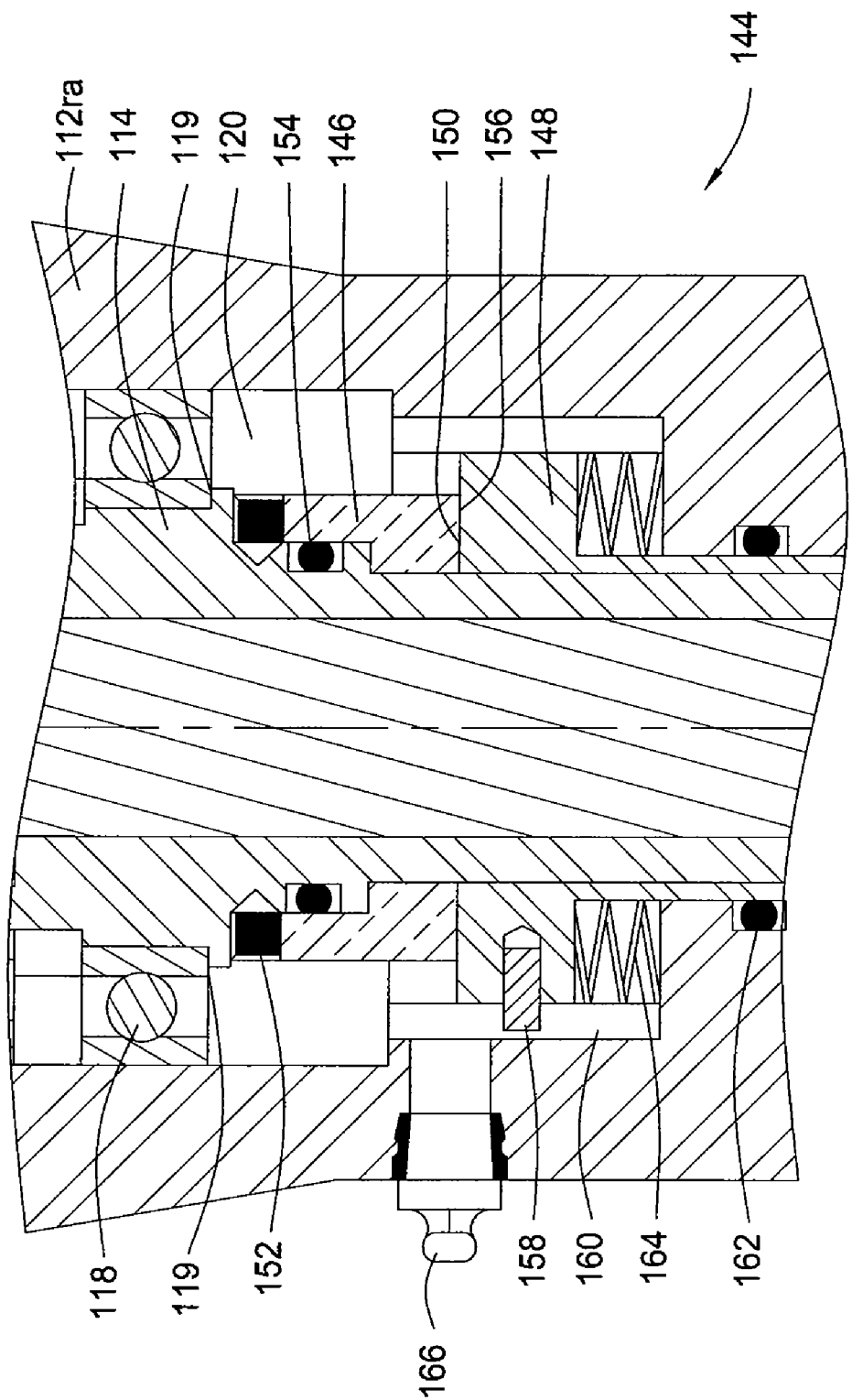
FIG. 1D is an enlarged side elevation view, in section, of a mechanical seal of the retrofit stuffing box of FIG. 1C.
Figure 1F:
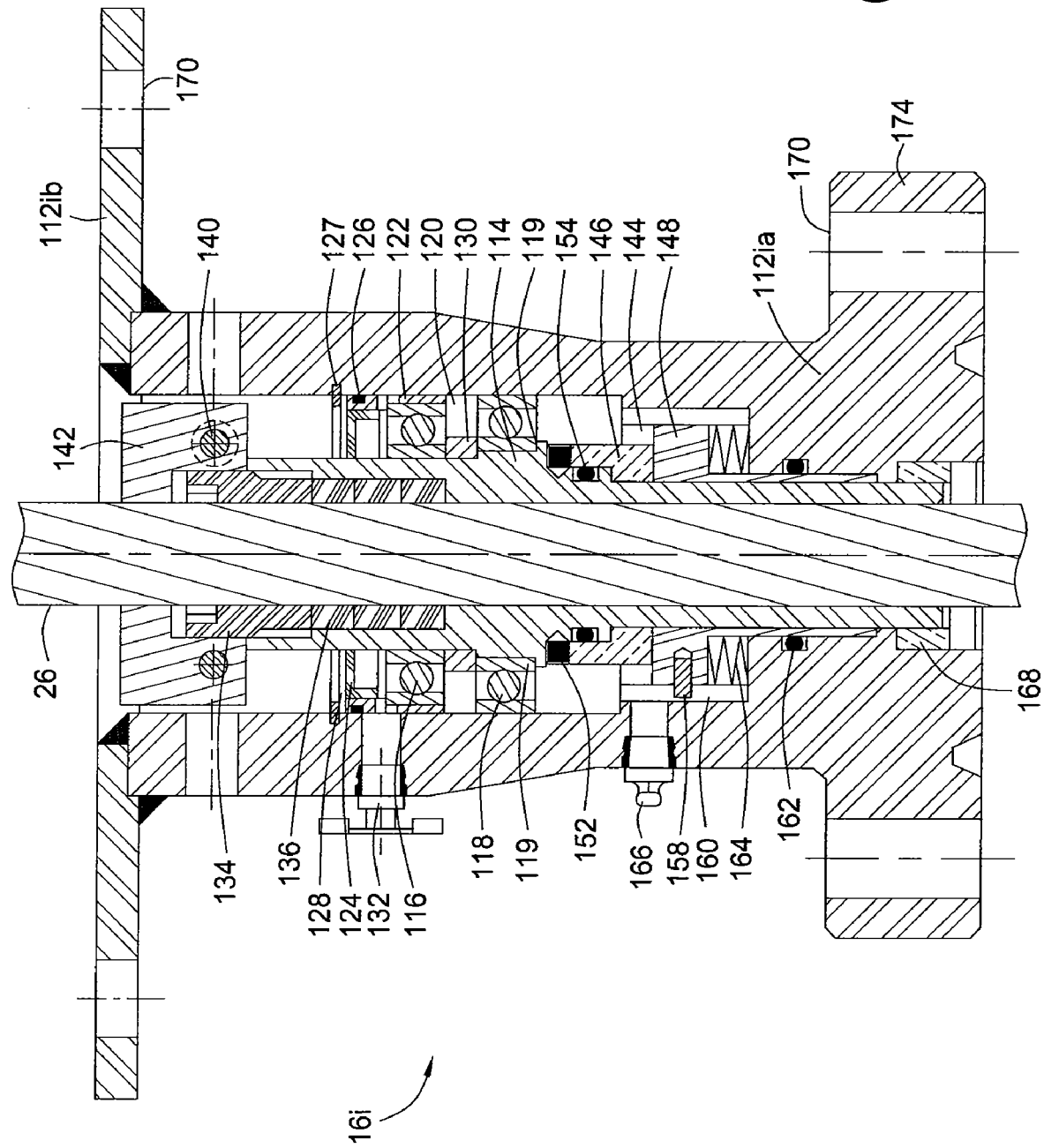
FIG. 1F is a side elevation view, in section, of a prior art integral stuffing box.
Figure 2:
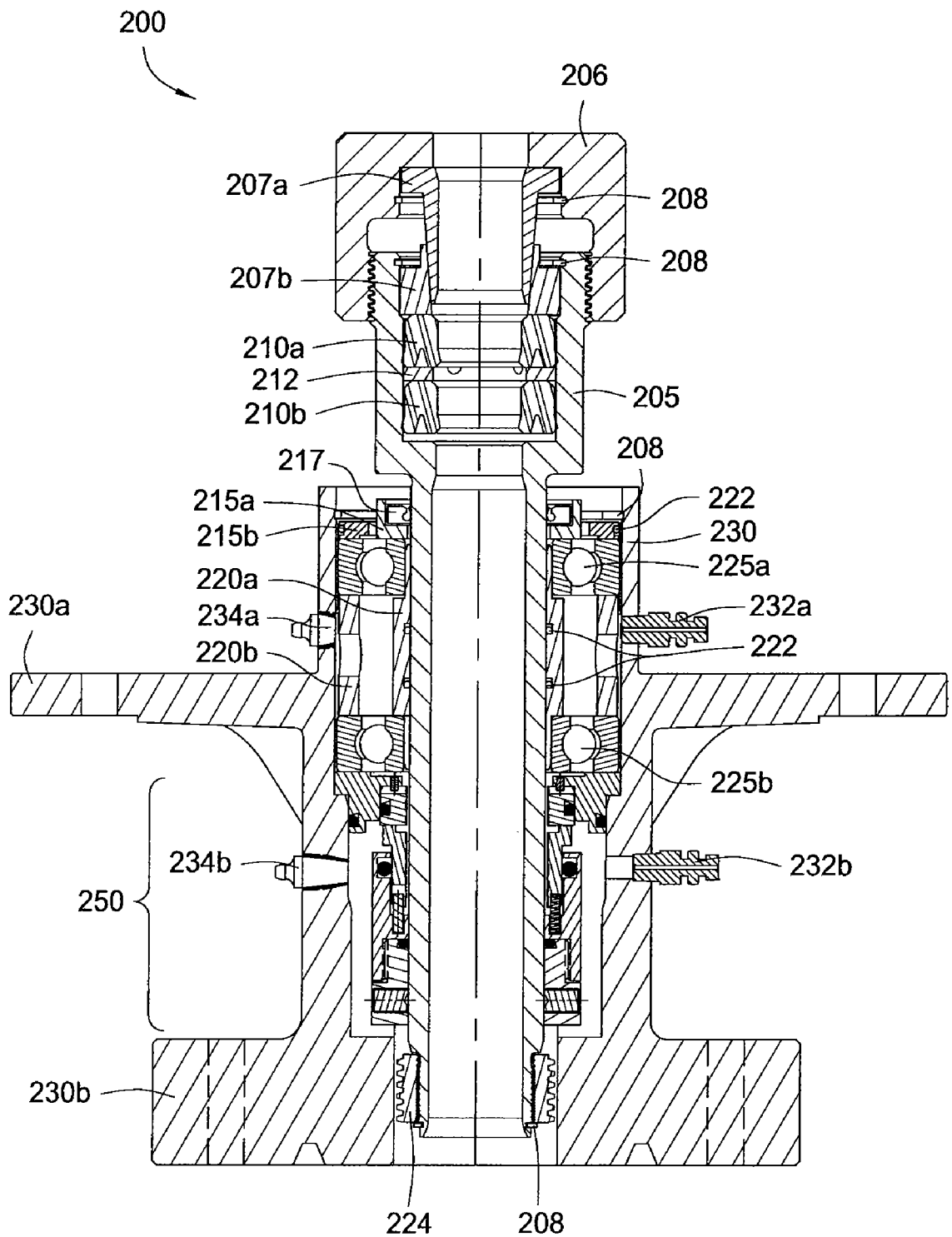
FIG. 2 is a sectional view of a retrofit stuffing box for a PC pump system, according to one embodiment of the present invention.

FIG. 2 is a sectional view of a retrofit stuffing box 200 for a PC pump system, according to one embodiment of the present invention. The stuffing box 200 may replace the stuffing box 16r and be used with the PC pump system 10 of FIG. 1. The retrofit stuffing box 200 includes a rotor assembly and a stator assembly. The rotor assembly includes a sleeve 205, a cap 206, a male bushing 207a, a female bushing 207b, one or more snap rings 208, one or more shaft seals 210a,b, a spacer ring 212, an inner lubricant seal housing 215a, a lubricant seal 217, a bearing sleeve 220a, one or more O-ring seals 222, one or more inner rings and balls of one or more bearing assemblies, such as ball bearing assemblies 225a,b, a rotor sub-assembly of a mechanical seal assembly 250 (discussed separately below), and a retaining ring 222.

The sleeve 205 is a tubular or annular member having a longitudinal bore therethrough. Each longitudinal end of the sleeve 205 is threaded on an outer surface thereof. The cap 206 is a tubular member having a bore therethrough and is threaded on an inner surface thereof at a longitudinal end thereof. The cap 206 is axially and rotationally coupled to the sleeve 205 with a threaded connection. Disposed along an inner surface of the cap 206 is the male bushing 207a. The male bushing 207a includes two semi-tubular segments, each having an inclined outer surface. Each segment of the male bushing 207a is disposed along an inner surface of the cap 206 and an inner surface of the female bushing 207b. The male bushing 207a is axially coupled to the cap 206 by abutment with a longitudinal end of the cap 206 and by abutment with a snap ring 208 disposed in a groove formed in an inner surface of the cap 206.

The female bushing 207b is a tubular member having a bore therethrough and a longitudinal cut through a wall thereof. The female bushing 207b is axially coupled to the sleeve 205 by abutment with a shoulder formed in an inner surface of the sleeve 205 and by abutment with a snap ring 208 disposed in a groove formed in an inner surface of the sleeve 205. An inner surface of the female bushing 207b is correspondingly tapered to the outer surface of the male bushing 207a, so that when the cap 206 is tightened, an inner surface of the male bushing 207a is wedged into contact with an outer surface of the drive shaft 26, thereby axially and rotationally coupling the drive shaft 26 with the sleeve 205.

Abutting a longitudinal end of the female bushing 207b is a first longitudinal end of a first shaft seal 210a. A spacer ring 212 abuts a second longitudinal end of the first shaft seal 210a and a first longitudinal end of the second shaft seal 210b. The spacer ring 212 is made from a relatively soft material (as compared to ASTM A36 steel), such as a soft metal or a polymer, such as polytetrafluoethylene (PTFE). A shoulder formed on an inner surface of the sleeve 205 provides a longitudinal back stop for a second longitudinal end of the second shaft seal 210b. The shaft seals 210a,b are annular members, each having a chevron profile formed in a second longitudinal end thereof. The chevron profiles are oriented facing away from the cap. An inner wing of each profile naturally extends radially inward past an outer diameter of the drive shaft 26 so that the wings of each profile will be compressed radially inward upon assembly of the stuffing box 200, thereby isolating a first portion of the sleeve 205 bore proximate the cap 206 from a second portion of the sleeve 205 bore distal from the cap 206.

The inner lubricant seal housing 215a is an annular member and is disposed along an outer surface of the sleeve 205. The inner lubricant seal housing 215a abuts a first longitudinal end of an inner ring of a first ball bearing assembly 225a. Disposed within the inner lubricant seal housing 215a is the lubricant seal 217. The lubricant seal 217 is compressed into contact with an outer surface of the sleeve 205, thereby preventing leakage of lubricant, such as grease, along the outer surface of the sleeve 205. The bearing sleeve 220a is an annular member and is disposed along an outer surface of the sleeve 205. The bearing sleeve 220a carries two O-ring seals 222 disposed along grooves formed in an inner surface thereof. An outer surface of the bearing sleeve 220a forms two shoulders. An inner ring of each of the ball bearing assemblies 225a,b is press fit on the outer surface of the bearing sleeve 220a, thereby axially and rotationally coupling the inner rings to the bearing sleeve. A second longitudinal end of the inner ring of the first ball bearing assembly 225a abuts a first shoulder of the bearing sleeve 220a and a first longitudinal end of the second bearing assembly 225b abuts a second shoulder of the bearing sleeve 220a. The retaining ring 224 is threaded on an inner surface thereof and rotationally coupled to the outer surface of the sleeve 205 with a threaded connection. The retaining ring 224 is axially coupled to the sleeve 205 by abutting a shoulder formed in an outer surface of the sleeve 205 and by a snap ring 208 disposed in a groove formed in an outer surface of the sleeve 205. An outer surface of the retaining ring 224 may be profiled.

The stator assembly includes a housing 230, an outer lubricant seal housing 215b, one or more outer rings of one or more bearing assemblies, such as ball bearing assemblies 225a,b, a bearing spacer 220b, one or more O-ring seals 222, one or more lubricant sampling valves 232a,b, one or more lubricant fittings, such as zerks 234a,b, one or more snap rings 208, and a stator sub-assembly of the mechanical seal assembly 250 (discussed separately below). Alternatively, one or more bushings (not shown) may be used instead of the ball bearing assemblies. The housing 230 is a tubular or annular member having a longitudinal bore therethrough and has first 230a and second 230b flanges formed integrally therewith. Alternatively, the flanges 230a,b may we welded on the housing 230. The first flange 230a connects the housing with the frame 14 and the second flange 230b connects the housing with the flow tee 22 or other flanged wellhead equipment.

The outer lubricant seal housing 215b is an annular member disposed along an inner surface of the housing 230. The outer lubricant seal housing 215b abuts a snap ring 208 disposed along the inner surface of the housing 230 at a first longitudinal end and a first longitudinal end of an inner ring of the first ball bearing assembly 225a at a second longitudinal end. The outer lubricant seal housing 215b carries an O-ring seal 222 along an outer surface thereof. A second longitudinal end of the outer ring of the first bearing assembly 225a abuts the bearing spacer 220b. The outer rings of the bearing assemblies 225a,b are press fit along an inner surface of the housing 230. The bearing spacer 220b is an annular or tubular member having a longitudinal bore therethrough and first and second radial lubricant ports formed through a wall thereof. The first lubricant port is in fluid communication with a first lubricant port formed radially through a wall of the housing and the second lubricant port is in fluid communication with a second lubricant port formed radially through a wall of the housing. A first lubricant fitting 234a is connected to the first lubricant port of the housing and a first sample valve 232a is connected to the second lubricant port of the housing. A second longitudinal end of the bearing spacer 220b abuts a first longitudinal end of an inner ring of the second bearing assembly 225b.

Figure 2A:
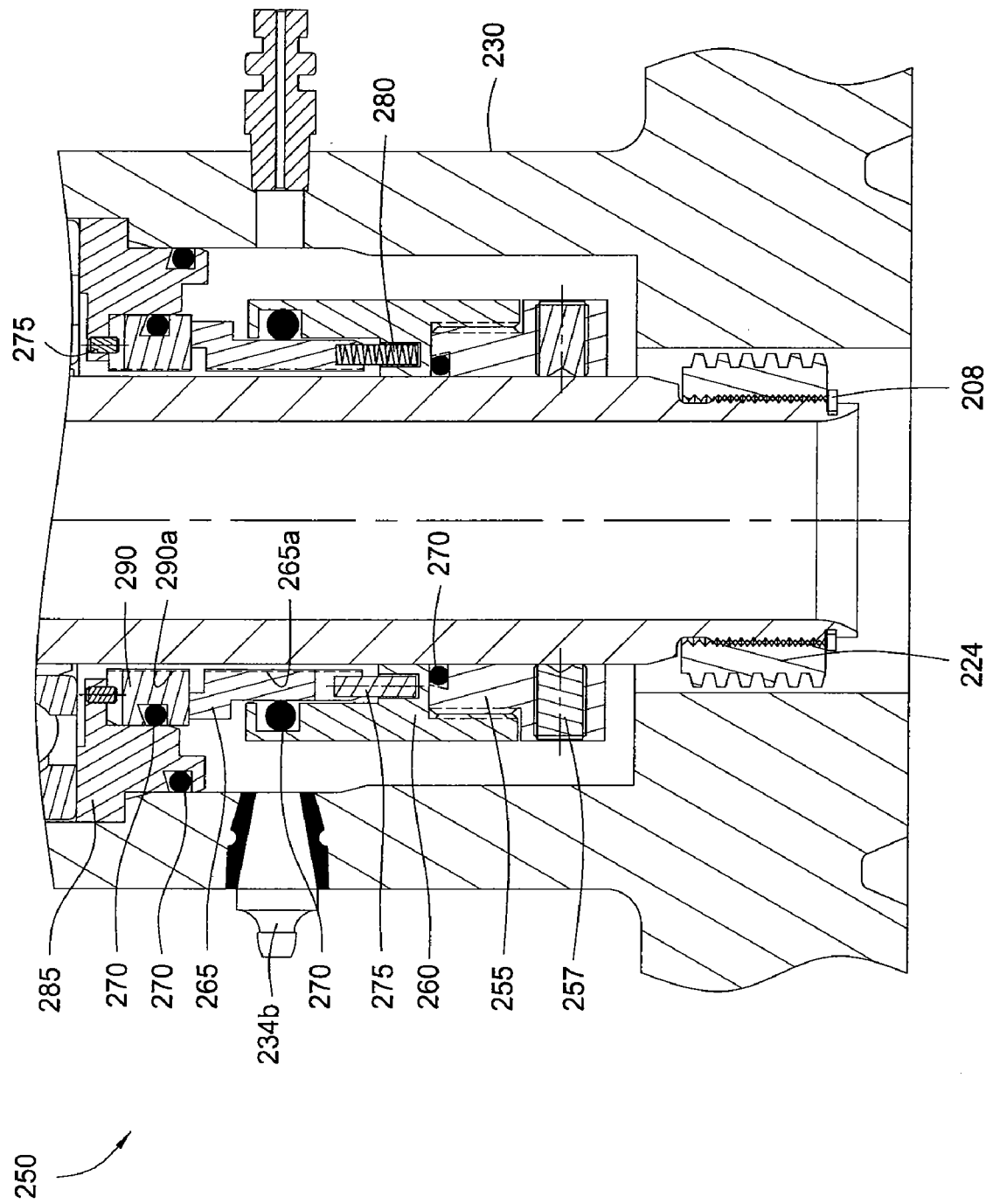
FIG. 2A is an enlarged portion of the mechanical seal assembly of FIG. 2.

FIG. 2A is an enlarged portion of the mechanical seal assembly 250 of FIG. 2. The mechanical seal assembly 250 includes the rotor sub-assembly and the stator sub-assembly. The stator sub-assembly includes a seal housing 285, a mechanical seal 290, one or more O-ring seals 270, and one or more retainers, such as pins 275. The stator seal housing 285 is a tubular or annular member and abuts a second longitudinal end of the inner ring of the second bearing assembly 225b at a first longitudinal end of the stator seal housing 285. The stator seal housing 285 may be press fit into the housing 230. A shoulder is formed along an outer surface of the stator seal housing 285. The outer shoulder of the stator seal housing 285 abuts a shoulder formed in an inner surface of the stuffing box housing 230. An o-ring seal 270 is disposed in a groove formed along the outer surface of the stator seal housing 285 and engages an inner surface of the stuffing box housing 230. A shoulder is formed along an inner surface of the stator seal housing 285. The inner shoulder of the stator seal housing 285 abuts a first longitudinal end of the stator mechanical seal 290.

The stator mechanical seal 290 is an annular member. The stator mechanical seal 290 is rotationally coupled to the stator seal housing 285 by the pins 275. Each pin 275 is press fit into a hole formed in or through the inner shoulder of the stator seal housing 285 and extends into a slot formed in the first longitudinal end of the stator mechanical seal 290. The stator mechanical seal 290 is made from a material harder or substantially harder than ASTM A36 steel, such as a ceramic, i.e., silicon carbide, such as alpha sintered or reaction bonded; a metal or alloy, such as gray cast iron, Hastelloy B, M-2 steel, Niresist, 316 stainless, 440C stainless, Stellite, T/C Cobalt, T/C Nickle; or carbon, such as siliconized graphite, such as PE-8148, reaction bonded, such as PR9242, reaction bonded plus graphite, such as PG9723, or alpha sintered, such as PS-10070 or PS-10138. An o-ring seal 270 is disposed in a groove formed in an outer surface of the stator mechanical seal 290 and engages the stator seal housing 285. An inner surface of the stator seal housing 285 is disposed proximate to the outer surface of the sleeve 205.

The rotor sub-assembly of the mechanical seal assembly 250 includes a seal retainer 255, two or more set screws 257, a seal sleeve 260, a mechanical seal 265, one or more O-ring seals 270, two or more retainers, such as pins 275, and two or more biasing members, such as springs 280. The rotor seal retainer 255 is an annular member. An inner surface of the rotor seal retainer 255 is disposed along an outer surface of the sleeve 205. The rotor seal retainer 255 is axially and rotationally coupled to the sleeve 205 by the set screws 257, each set screw 257 disposed through a radial threaded hole disposed through the rotor seal retainer 255 near a second longitudinal end of the rotor seal retainer 255. A first portion of the outer surface of the rotor seal retainer 255 is threaded and a second portion of the outer surface forms a shoulder. An o-ring seal 270 is disposed in a groove in a first longitudinal end of the rotor seal retainer 255 and engages the outer surface of the sleeve 205 and a first longitudinal face of a radial portion of the seal sleeve 260. The first longitudinal end of the rotor seal retainer 255 abuts the first longitudinal face of the radial portion of the seal sleeve 260.

The seal sleeve 260 is a tubular or annular member having a longitudinal portion and the radial portion. An inner surface of the radial portion is disposed along the sleeve 205 and an outer surface of the longitudinal portion faces an inner surface of the housing 230. A second end of the longitudinal portion is threaded on an inner surface and by engaged to the threaded outer portion of the rotor seal retainer 255. An o-ring seal 270 is disposed in a groove formed in an inner surface near a first longitudinal end of the longitudinal portion of the seal sleeve 260 and engages an outer surface of the rotor mechanical seal 265. A plurality of holes are formed in a first longitudinal face of the radial portion of the seal sleeve 260. Disposed in each of the holes is either one of the pins 275 or one of the springs 280. When a pin 275 is disposed in one of the holes, the pin 275 extends into a slot formed in a second longitudinal end of the rotor mechanical seal 265, thereby rotationally coupling the rotor mechanical seal 265 to the seal sleeve 260. When a spring 280 is disposed in one of the holes, the spring 280 is compressed between an end of the hole and the second longitudinal end of the rotor mechanical seal 265. Alternatively, the seal sleeve 260 and springs 280 could be coupled to the stator mechanical seal 290 instead of the rotor mechanical seal 265. The rotor mechanical seal 265 is an annular member and is made from any of the materials discussed above for the stator mechanical seal 290. The first longitudinal end of the rotor mechanical seal 265 held into engagement with the second longitudinal end of the stator mechanical seal 290 by the one or more springs. To facilitate replacement of the mechanical seals 265,290 without removing the drive head 12, the mechanical seals 265,290 are optionally pre-weakened along longitudinal lines 265a,290a, respectively. Sharp blows by a technician with a hammer will serve to break each of the mechanical seals 265,290 into two semi-annular segments. The O-rings 270 may simply be cut to allow removal.

Figure 2B:
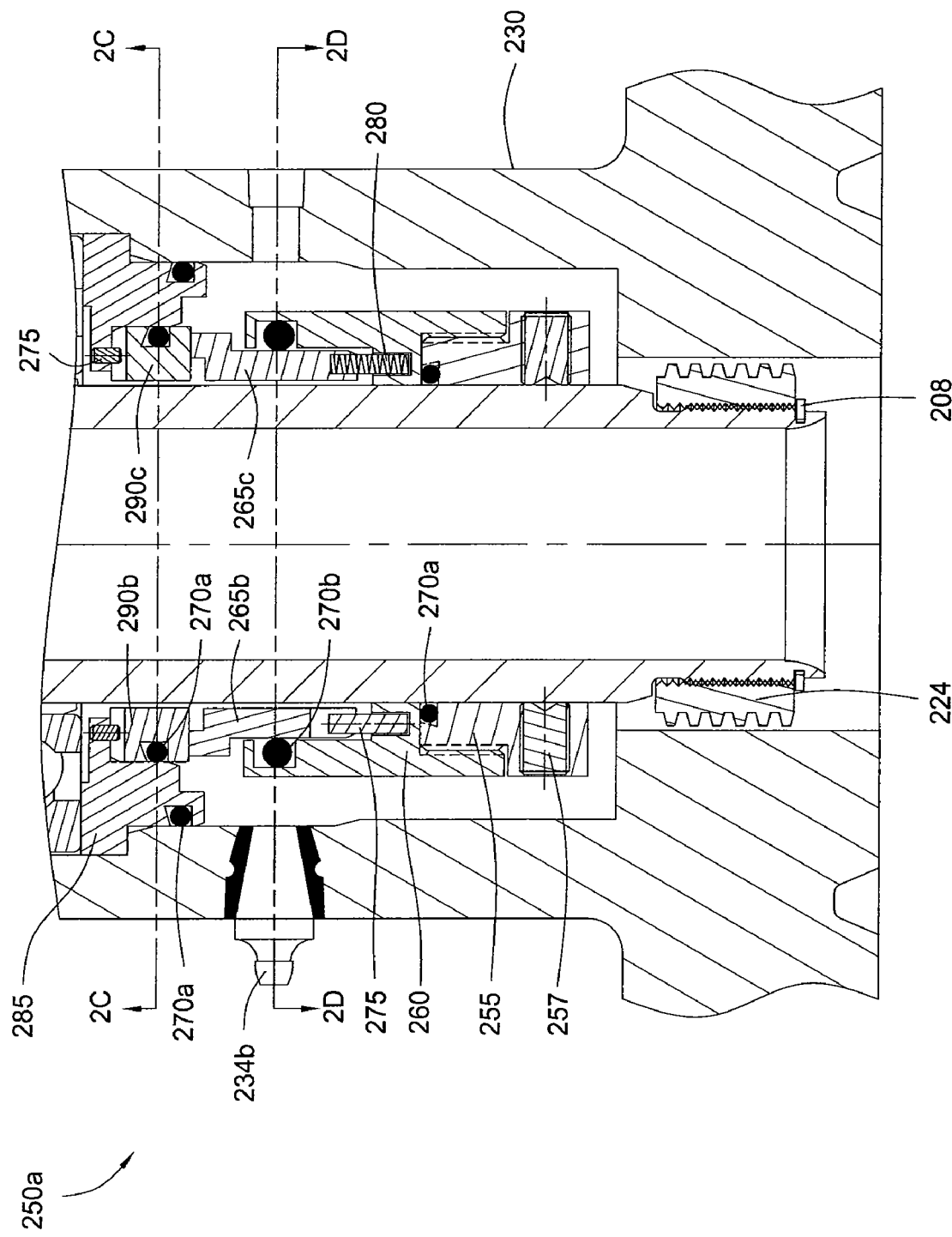
FIG. 2B is a sectional view of a split mechanical seal assembly, according to another embodiment of the present invention.
Figure 2C:
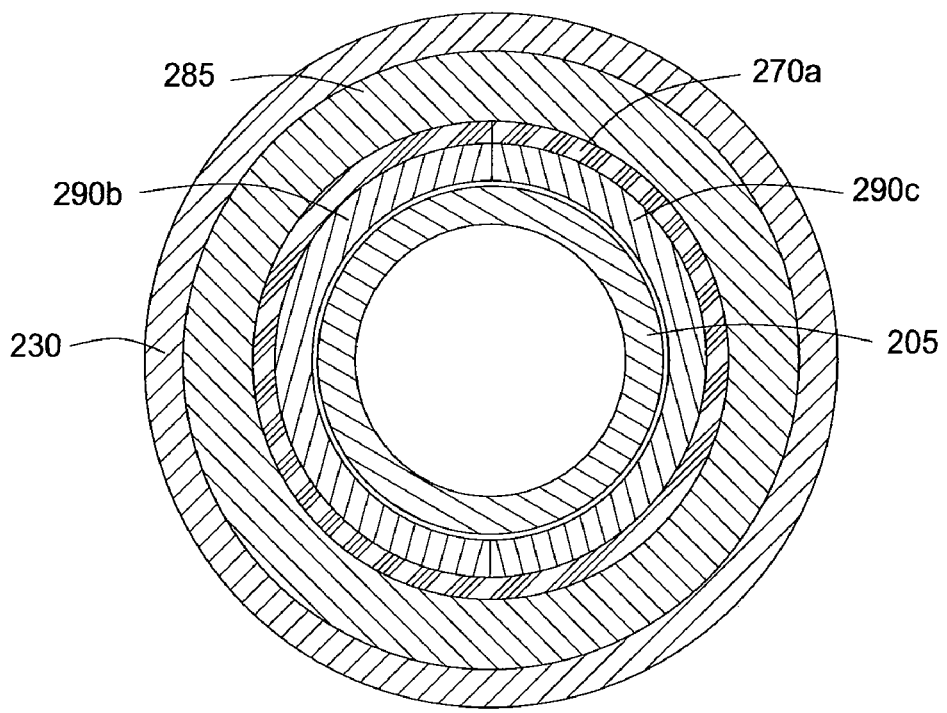
FIGS. 2C and 2D are sections taken along lines 2C-2C and 2D-2D, respectively of FIG. 2B.
Figure 2D:
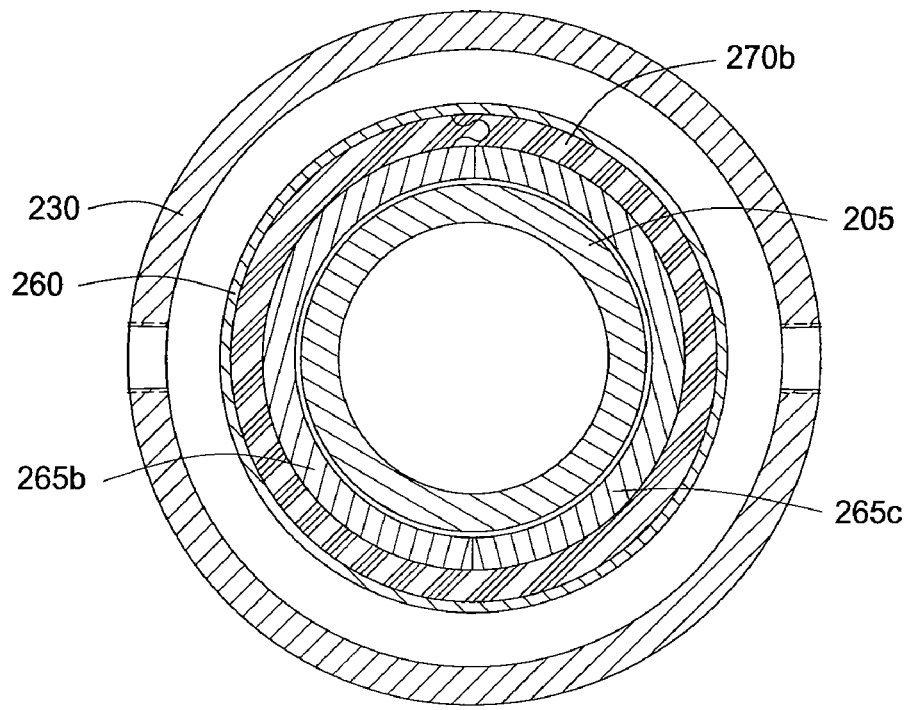

FIG. 2B is a sectional view of a split mechanical seal assembly 250a, according to another embodiment of the present invention. FIGS. 2C and 2D are sections taken along lines 2C-2C and 2D-2D, respectively of FIG. 2B. The split mechanical seal assembly 250a includes the seal housing 285, two semi-annular stator mechanical seal segments 290b,c and the two or more retainers, such as the pins 275, one or more split O-ring seals 270a,b, the seal retainer 255, the two or more set screws 257, the seal sleeve 260, two semi-annular rotor mechanical seal segments 265b,c, and the two or more biasing members, such as the springs 280. Once the mechanical seal assembly 250 has been disassembled (without removing the drive head), the mechanical seals 265,290 broken and removed, and the O-rings 270 cut and removed, the mechanical seals 265,290 may be replaced by the split mechanical seals 265b,c and 290b,c and the O-ring seals 270 may be replaced by split O-ring seals 270a,b.

The mechanical seal segments 265b,c and 290b,c are made starting from respective annular mechanical seals 265,290, each having a pre-weakened longitudinal lines 265a,290a. The annular mechanical seals 265,290 are then each carefully broken apart under controlled factory conditions. This creates corresponding rough radial faces on each radial face of respective semi-annular segments 265b,c and 290,b,c so that, when assembled, corresponding ridges and grooves of the rough radial faces interlock to form a radial seal.

As shown, each split O-ring seal 270a is butt-cut at free radial ends thereof and the O-ring seal 270b includes a ball and socket fastening mechanism located at radial free ends thereof. Each groove of the O-ring seal 270a is specially configured to force the free radial ends of each O-ring seal into radial engagement. This special configuration entails an asymmetric shaped groove (cross-section shape) having one straight longitudinal/radial end and one inclined longitudinal/radial end depending on whether the O-ring seal is sealing a radial face or a longitudinal face. Consequently, one radial/longitudinal face is also longer than the other radial/longitudinal face. Alternatively, one, some, or all of the O-ring seals 270a,b may have ball and socket fastening mechanisms, be butt-cut, be scarf-cut, and/or may include adhesive joining the free radial ends thereof. At one radial end, each O-ring seal 270b narrows into a substantially hemispherical shoulder portion and, adjacent thereto, an annular neck portion. Immediately adjacent the neck portion is a substantially spherical head portion. In fastening, the head portion is inserted into a matching spherical socket portion at the other radial end of each O-ring seal 270b such that annular collar portion surrounds and captures the neck portion, and shoulder portion is in intimate contact with annular jacket portion.

Figure 2E:
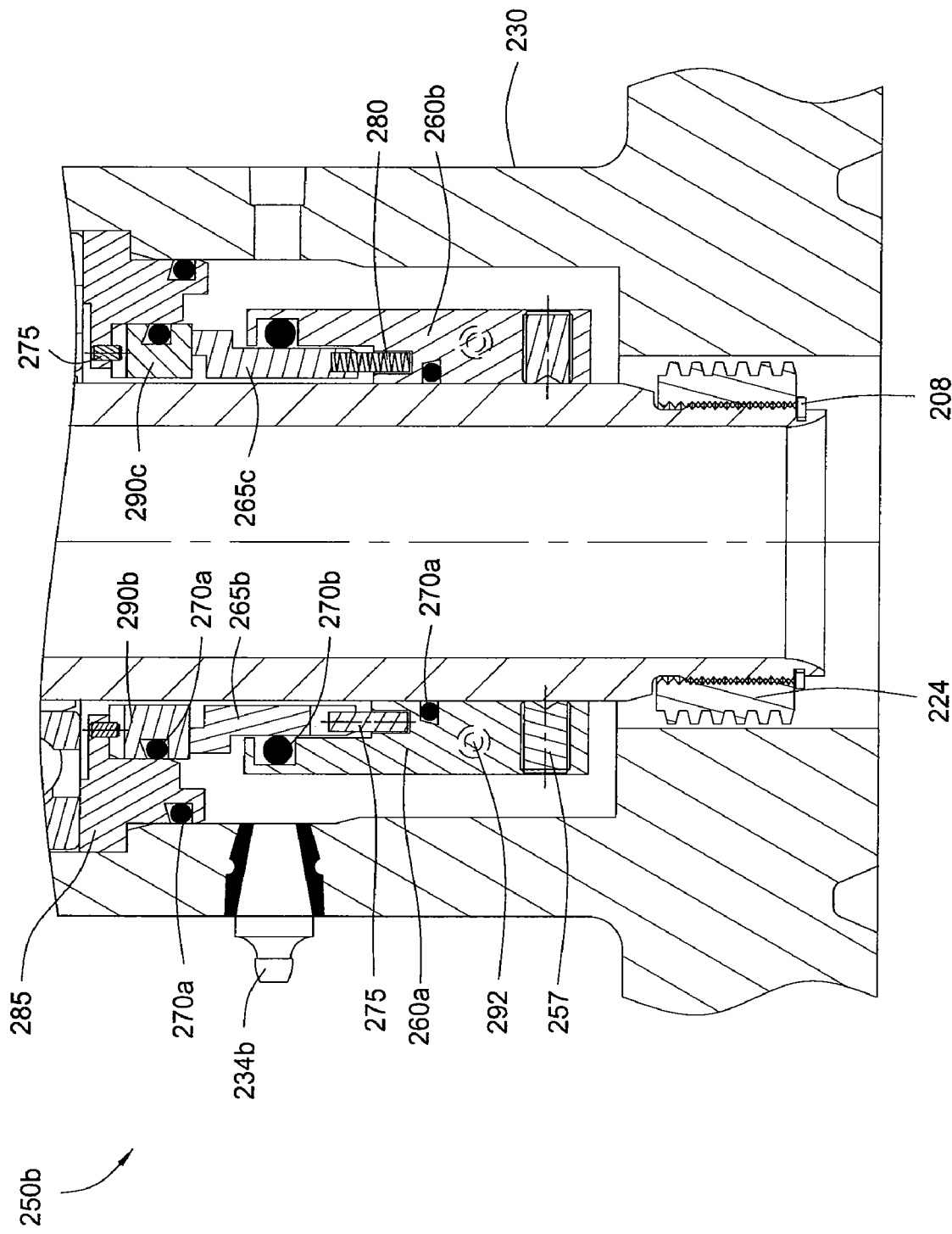
FIG. 2E is a sectional view of a split mechanical seal assembly, according to another embodiment of the present invention.

FIG. 2E is a sectional view of a split mechanical seal assembly 250b, according to another embodiment of the present invention. The mechanical seal assembly 250b is identical to the mechanical seal assembly 250a except that a mechanical seal sleeve assembly 260a,b replaces the seal sleeve 260 and the seal retainer 255. Alternatively or in addition to, the stator seal housing 285 may similarly be replaced by an assembly of semi-annular segments. Semi-annular segments 260a,b are radially connected at radial ends thereof by threaded fasteners 292 and have gaskets (not shown) disposed between each pair of mating radial ends. The gaskets are made from a soft fibrous material or a soft metal. The mechanical seal assembly 250b may also be initially installed with the seals 265, 270, and 290 and then the seals replaced with the seals 265a,b, 270a,b, and 290a,b.

Figure 3:
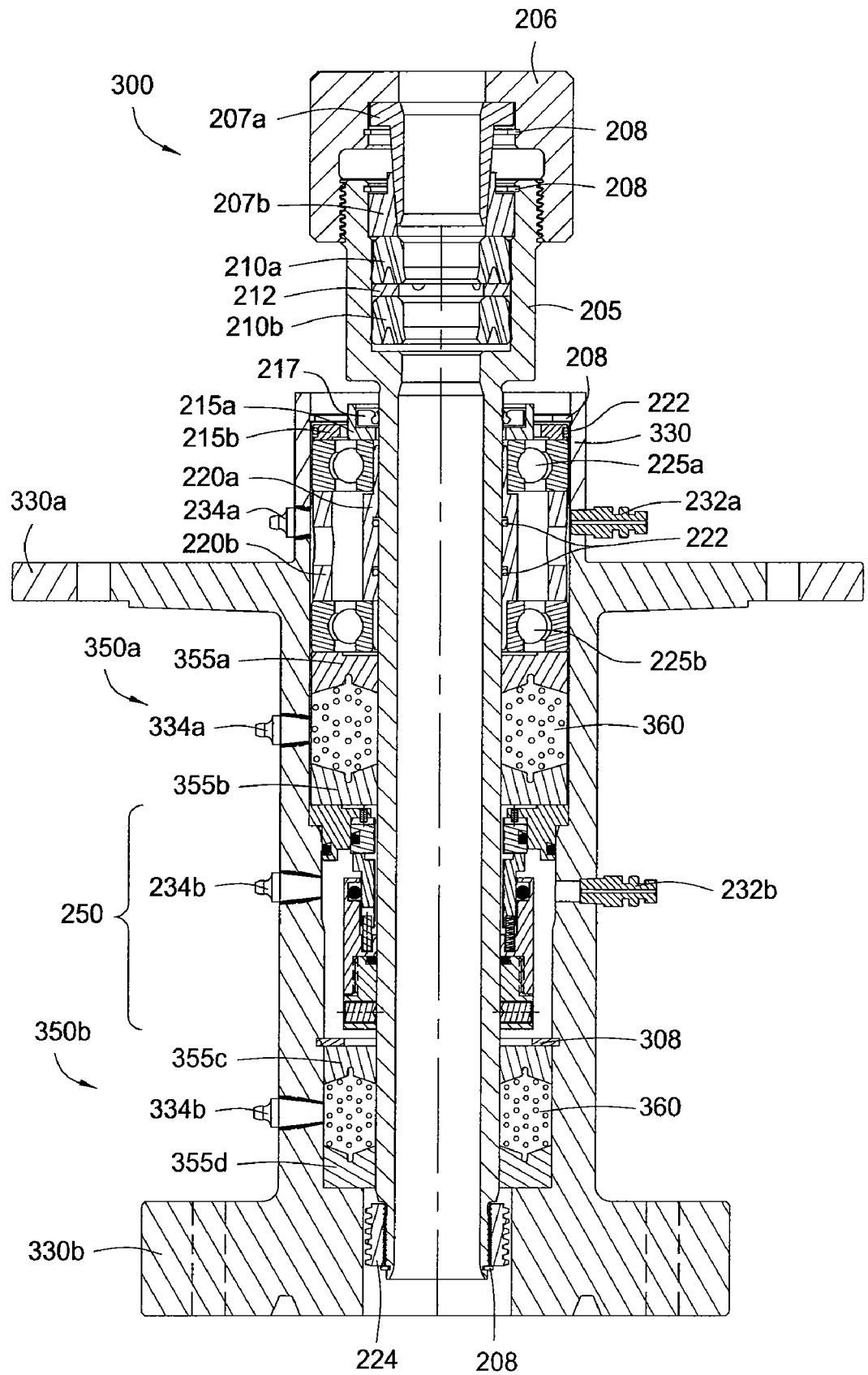
FIG. 3 is a sectional view of a retrofit stuffing box for a PC pump system, according to another embodiment of the present invention.

FIG. 3 is a sectional view of a retrofit stuffing box 300 for a PC pump system, according to another embodiment of the present invention. Like numbered members are identical to those of FIG. 2 and will not be discussed again. The stuffing box 300 may replace the stuffing box 16r and be used with the PC pump system 10 of FIG. 1. Although, the mechanical seal assembly 250 is shown, it may be replaced by the split mechanical seal assembly 250a, as discussed above. Alternatively, the mechanical seal assembly 250b may be used instead of the mechanical seal assembly 250a. The housing 330 is a tubular member having a longitudinal bore therethrough and has first 330a and second 330b flanges formed integrally therewith. Alternatively, the flanges 330a,b may we welded on the housing 330. The first flange 330a connects the housing with the frame 14 and the second flange 330b connects the housing with the flow tee 22 or other flanged wellhead equipment. The housing 330 has been elongated relative to the housing 230 to accommodate one or more injectable seal assemblies 350a,b.

A first injectable seal assembly 350a is longitudinally disposed between the second ball bearing assembly 220b and the stator seal housing 285. A second injectable seal assembly 350b is longitudinally disposed between a snap ring 308 disposed in a groove formed in an inner surface of the housing 330 and a shoulder of the housing 330. Each of the injectable seal assemblies 350a,b includes first 355a,c and second 355*b,d* injectable material retainers. In addition, washers (not shown) may be disposed adjacent one or more of the retainers 355*a-d* to further longitudinally support the retainers 355*a-d*. The washers may be coupled to the housing 330 by snap rings 308. The injectable material retainers 355*a-d* are made from a relatively hard (as compared to rubber) polymer, such as a thermoplastic, such as polyetheretherketone (PEEK) or PTFE, or a soft metal (as compared to ASTM A36 steel).

Each of the injectable material retainers 355*a-d* is a split annular member (similar to split O-ring 270*b*) having a first longitudinal end and a second longitudinal end. Alternatively, upon initial installation, each retainer 355*a-d* may be annular and then be removed by cutting and replaced by a split annular member. Alternatively, each retainer may resemble split O-ring 270*a* or any of the alternatives discussed in relation to the split O-rings 270*a,b*. One of the longitudinal ends, which faces the injectable material 360, is substantially chevron-shaped and includes a first wing and a second wing. The injectable material 360 is a mixture of grease or jelly with fibers made from a polymer, such as a thermoplastic, such as a liquid crystalline polymer, such as Kevlar. The injectable material 360 is injected into the housing 330 through a fitting, such as a zerk 334*a,b*. The material is injected until a predetermined pressure is generated. The pressure causes the wings of the retainers 355*a-d* to expand into engagement with an inner diameter of the housing and an outer diameter of the sleeve. The predetermined pressure may be greater than or equal to the operating pressure of the stuffing box 300. Each injectable seal assembly 350*a,b* may be intermittently manually re-pressurized or connected, via tubing, to process pressure in the wellhead. In this manner, the injectable material 360 may fill any leak paths which develop in the stuffing box 300. Further, the second injectable seal assembly 350*b* may also serve to prevent particulates in the production fluid, such as sand, from entering the mechanical seal assembly 250, 250*a*. The first injectable seal assembly 350*a* may also prevent sand from entering the ball bearing assemblies 225*a,b*. Using the injectable seal assemblies 350*a,b* as a pressurizing/backup seal makes time between repairs longer and provides a better seal and less leakage potential. Alternatively, only one of the injectable seal assemblies 350*a,b* may be used. Alternatively, a side feed rope seal may be used instead of the injectable material 360.

Figure 4:
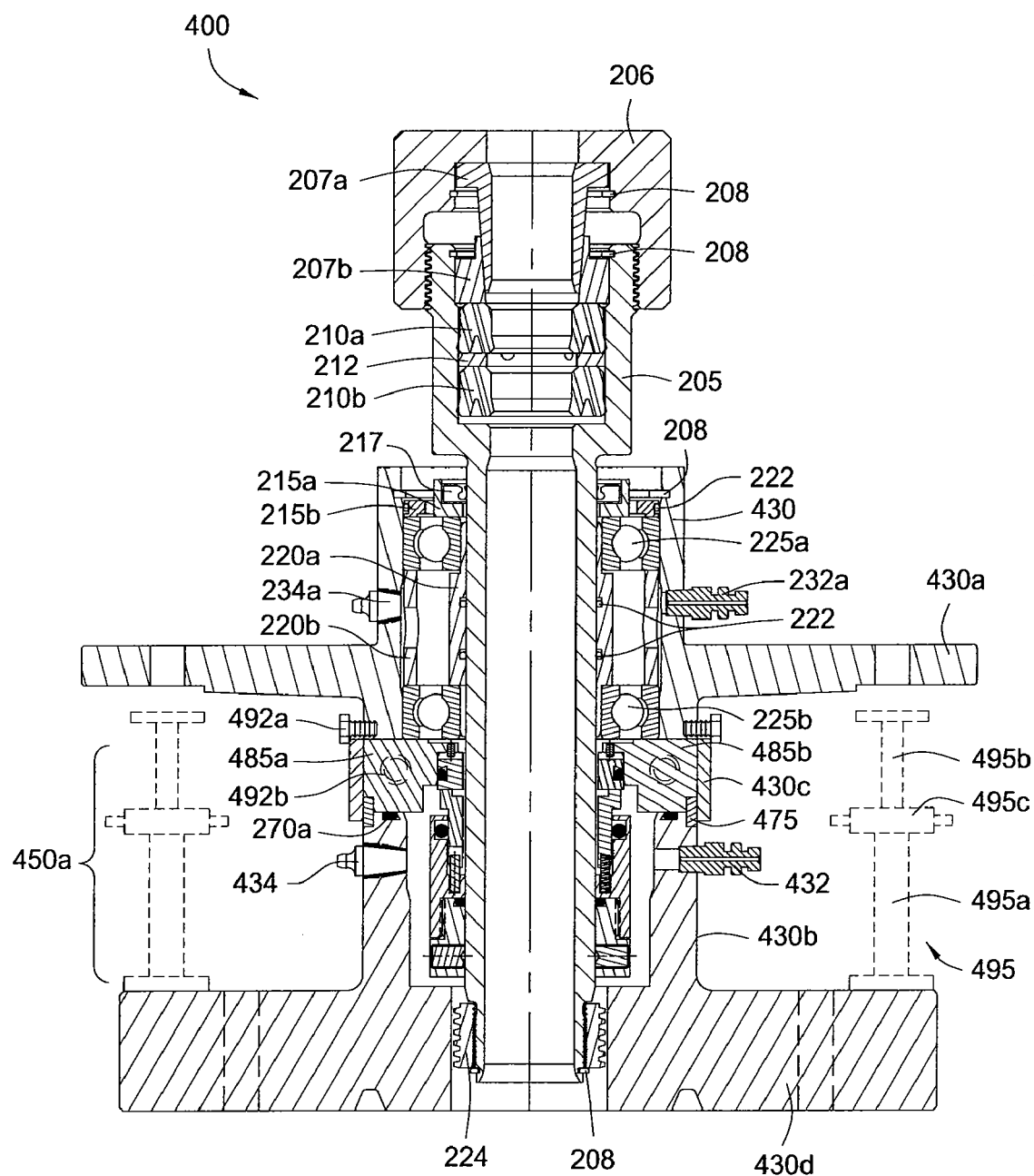
FIG. 4 is a sectional view of a retrofit stuffing box for a PC pump system, according to another embodiment of the present invention.

FIG. 4 is a sectional view of a retrofit stuffing box 400 for a PC pump system, according to another embodiment of the present invention. Like numbered members are identical to those of FIG. 2 and will not be discussed again. The stuffing box 400 may replace the stuffing box 16*r* and be used with the PC pump system 10 of FIG. 1. The housing assembly includes a first housing 430, a second housing 430*b*, a stator mechanical seal housing assembly 485*a,b*, and an optional cover 430*c*. The first housing 430 is a tubular or annular member having a longitudinal bore therethrough and has a flange 430*a* formed integrally therewith. The second housing 430*b* is a tubular or annular member having a longitudinal bore therethrough and has a flange 430*d* formed integrally therewith. Alternatively, the flanges 430*a,d* may we welded on the respective housings 430,430*b*. The flange 430*a* connects the first housing 430 with the frame 14 and the flange 430*d* connects the second housing 430*b* with the flow tee 22 or other flanged wellhead equipment.

The mechanical seal assembly 450*a* is identical to the mechanical seal assembly 250*a* except that a stator mechanical seal housing assembly 485*a,b* replaces the stator mechanical seal housing 285. Alternatively, a similarly modified mechanical seal assembly 250*b* may be used instead. A second longitudinal end of the first housing 430 abuts first longitudinal ends of semi-annular segments 485*a,b* of the stator mechanical seal housing assembly. The semi-annular segments 485*a,b* are radially connected at radial ends thereof by threaded fasteners 492*b* and have gaskets (not shown) disposed between each pair of mating radial ends. The gaskets are made from a soft fibrous material or a soft metal. Second longitudinal ends of semi-annular segments 485*a,b* of the stator mechanical seal housing assembly abut a first longitudinal end of the second housing 430*b*. The second longitudinal ends of semi-annular segments 485*a,b* have slots formed therein at outer peripheries thereof. The first longitudinal end of the second housing 430*b* has corresponding slots formed therein at an outer periphery thereof. Disposed in each corresponding pair of slots is a pin 475. The pins 475 rotationally couple the semi-annular segments to the second housing 430*b*. A split o-ring 270*a* is disposed in a groove formed in the first longitudinal end of the second housing 430*b* and engages the second longitudinal ends of the semi-annular segments 485*a,b*. Alternatively, the split O-ring seal 270*b* or any of the alternatives discussed for the split O-ring seals 270*a,b* may be used.

The cover 430*c* is an annular member and has holes radially formed through a wall thereof near a first longitudinal end thereof. Corresponding threaded holes are formed in an outer surface of the first housing 430 near the second longitudinal end thereof. Threaded fasteners 492*a* are disposed in the holes and attach the cover 430*c* to the first housing 430. The cover 430*c* longitudinally extends past the stator mechanical seal housing assembly 485*a,b* so that a second longitudinal end of the cover 430*c* is nearly in longitudinal alignment with the first longitudinal end of the second housing 430*b*. The cover also radially holds the pins 475 in place. With the exception of the stator mechanical seal housing assembly 485*a,b*, the rest of the mechanical seal assembly 450*a* is identical to the mechanical seal assembly 250*a*.

The configuration of the stuffing box 400 allows for the removal and replacement of the mechanical seals 265*b,c* and 290*b,c* without having to remove the bearing assemblies 225*a,b*. Further, a similarly configured integral stuffing box version (which would replace the stuffing box 16*i* of FIG. 1) would allow for replacement of the mechanical seals 265*b,c* and 290*b,c* without removing the drive head 12 or the bearing assemblies 225*a,b*. When it is desired to remove the mechanical seals 265*b,c* and 290*b,c*, the PC pump system 10 is shut down. The lubricant fitting 434, sampling valve 432, and cover fasteners 492*a* are removed, thereby allowing the cover 430*c* to slide to the second housing flange 430*d*, thereby exposing the stator mechanical seal housing assembly 485*a,b*.

Three or more jack assemblies 495 are set on a first longitudinal end of the second housing flange 430*d*. Each of the jack assemblies 495 includes a housing 495*a*, a jack rod 495*b*, and a manual actuator 495*c*. The jack housing 495*a* includes a base plate attached thereto at a second longitudinal end thereof and is set on a first longitudinal end of the second housing flange 430*d* near an outer surface thereof so as to provide sufficient radial clearance for removal of the stator mechanical seal housing assembly 485*a,b*. The jack rod 495*b* is threaded on an outer surface thereof and one of the jack housing 495*a* and the mechanical actuator 495*c* is threaded on an inner surface thereof, thereby axially coupling the jack rod to the jack housing. The actuator 495*c* may either be attached to a first longitudinal end of the jack rod 495*b* or longitudinally and radially coupled for rotation to a first longitudinal end of the jack housing 495*a*. Turning of the actuator 495*b* will longitudinally raise or lower the jack rod 495*b*.

The jack rod 495*b* includes a support plate longitudinally and radially coupled thereto at the first longitudinal end of the jack rod 495*b*. The support plate may pivot relative to the jack rod 495*b*. Alternatively, the jack assemblies 495 may be hydraulic, pneumatic, or any other type of jack and may be manually or automatically actuated.

The jack rods are raised, in tandem, to engage a second longitudinal end of the first housing flange 430*a*. The jack rods 495*b* are further raised, thereby raising the first housing flange 430*a* until a longitudinal clearance is created between the stator seal housing assembly 485*a,b* and the first housing 430, thereby indicating that weight of the first housing 430 is fully supported by the jack assemblies 495. The stator mechanical seal assembly fasteners 492*b* are removed and the semi-annular segments of the stator mechanical seal assembly 485*b,c* are removed. The mechanical seals 265*a,b* and 290*a,b* are removed and replaced. Alternatively, as discussed in relation to FIG. 2, seals 265, 290, and 270 could be initially installed in the mechanical seal assembly 450*a* and later replaced with seals 265*b,c*, 290*b,c*, and 270*a,b*.

Figure 5:
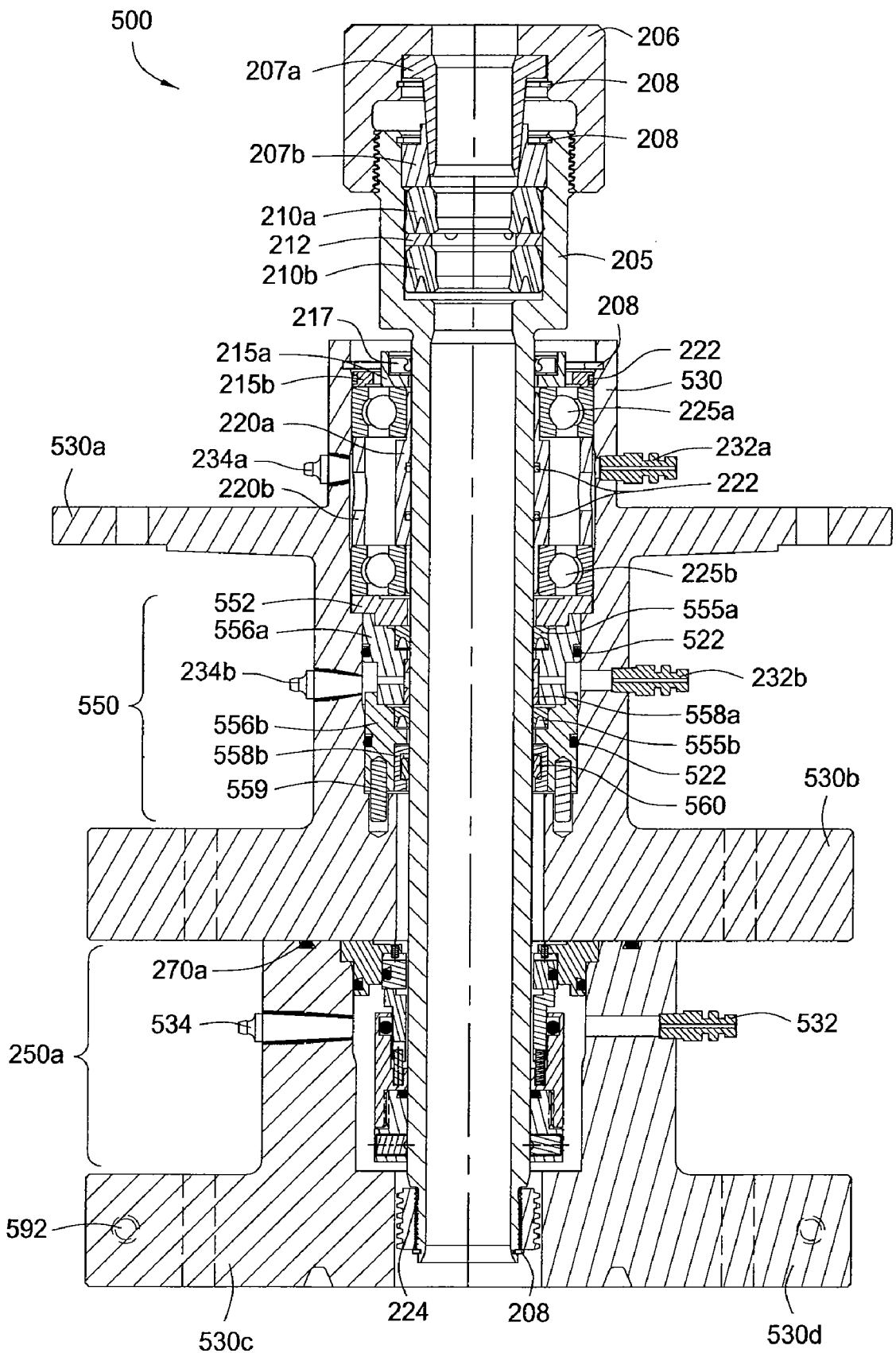
FIG. 5 is a sectional view of a retrofit stuffing box for a PC pump system, according to another embodiment of the present invention.

FIG. 5 is a sectional view of a retrofit stuffing box 500 for a PC pump system, according to another embodiment of the present invention. Like numbered members are identical to those of FIG. 2 and will not be discussed again. The stuffing box 500 may replace the stuffing box 16*r* and be used with the PC pump system 10 of FIG. 1. The housing assembly includes a first housing 530 and a flange assembly 530*c,d*. The first housing 530 is a tubular or annular member having a longitudinal bore therethrough and has a first flange 530*a* and a second flange 530*b* formed integrally therewith. Alternatively, the flanges 530*a,b* may be welded on the housing 530.

Abutting a second longitudinal end of the housing 530 is a first longitudinal end of the flange assembly 530*c,d*. Alternatively, the flange assembly 530*c,d* may abut the first longitudinal end of the housing 530. In this alternative, the secondary seal assembly 550 may be omitted and the housing 530 shortened accordingly. Further, in this alternative, the flange 530*a* may have extra holes to facilitate attachment of the flange assembly thereto. The flange assembly 530*c,d* includes semi-annular segments 530*c,d* radially attached with threaded fasteners 592. As shown, the flange assembly 530*c,d* is specifically configured, however, the flange assembly 530*c,d* may be a conventional American Petroleum Institute (API) split flange. The flange assembly 530*c,d* may be rotationally coupled to the housing by using long studs when attaching the first housing flange 530*b* and flange assembly 530*c,d* to the flow tee 22 or other flanged wellhead equipment. Alternatively, pins (not shown) may be press fit into first longitudinal ends of the flange segments and received in corresponding holes in the first housing 530. An optional split o-ring 270*a* is disposed in grooves formed in first longitudinal ends of the flange segments 530*c,d* and engages a second longitudinal end of the first housing flange 530*b*. Alternatively, the split O-ring 270*b* or any of the alternatives discussed in relation to the split O-rings 270*a,b* may be used.

Disposed in the flange assembly 530*c,d* is the mechanical seal assembly 250*a*. Alternatively, as discussed in relation to FIG. 2, the mechanical seal assembly 250 may initially be installed in the flange assembly 530*c,d* and later replaced with the mechanical seal assembly 250*a*. Alternatively, the mechanical seal assembly 250*b* may be used instead of the mechanical seal assembly 250*a*. The seals 265*b,c*, 290*b,c*, and 270*a,b* of the mechanical seal assembly 250*a* are replaceable, without having to remove the bearing assemblies 225*a,b*, by lifting the housing 530 with a crane (not shown), disassembling the flange assembly 530*c,d*, lifting the stator seal housing 285, and removing the seals 265*b,c*, 290*b,c*, and 270*a,b*. Alternatively, a similar configuration could be used for an integral stuffing box (which would replace the integral stuffing box 16*i*). The housing 530 includes an optional conventional stuffing assembly 550. Alternatively, the stuffing assembly 550 may be replaced with an injectable seal assembly 350*a*, a second mechanical seal assembly 250*a*, or the space occupied by the stuffing assembly left vacant (or the housing could be shortened). The stuffing assembly 550 acts as a secondary seal which may prevent any leaks through the mechanical seal assembly 250*a* from entering the bearing assemblies 225*a,b*. Although not replaceable without removing the drive head 12, the conventional stuffing assembly 550 may still be effective as a secondary seal even after its primary seal service life has expired.

The conventional stuffing assembly 550 includes a stator sub-assembly and a rotor sub-assembly. The stator sub-assembly includes a seal retainer 552, first 555*a* and second seals 555*b*, first 556*a* and second 556*b* seal housings, one or more O-ring seal assemblies 522, first 558*a* and second 558*b* bushings, and one or more pins 559. The rotor sub-assembly includes a seal 560.

The seal retainer 552 is an annular member having an outer surface disposed along an inner surface of the housing and an inner surface proximally facing an outer surface of the sleeve 205. A first longitudinal end of the seal retainer 552 abuts a second longitudinal end of the outer ring of the second bearing assembly 225*b*. A longitudinal face of the seal retainer 552 abuts a shoulder formed in an inner surface of the housing 530 and faces an outer portion of a first longitudinal end of the first seal housing 556*a*. A radial shoulder of the seal retainer 552 is press fit with a radial shoulder of the first seal housing 556*a*. A second longitudinal end of the seal retainer 552 abuts a first longitudinal face of the first seal housing 556*a* and a first longitudinal end of the first stator seal 555*a*. The seal housings 556*a,b* are annular members. The stator seals 555*a,b* are annular members, each having a radial lip extending outwardly at a first longitudinal end thereof and a chevron shaped second longitudinal end. The first stator seal 555*a* is radially disposed between a second radial shoulder of the first seal housing 556*a* and an outer surface of the sleeve 205. The first stator seal lip extends into a groove formed in the first longitudinal face of the first seal housing 556*a*. Pressure acting on wings of the second longitudinal end of the first stator seal 555*a* radially expands the wings into engagement with a first radial face of the first seal housing and the outer surface of the sleeve 205. The second longitudinal end of the first stator seal 555*a* proximally faces a second longitudinal face of the first stator seal housing 556*a*. An O-ring assembly 522 is disposed in a groove formed in an inner surface of the first seal housing 556*a*. The O-ring assembly 522 includes an o-ring seal and a back-up ring. The o-ring seal engages an inner surface of the housing 530.

The first bushing 558*a* is an annular member having an inner surface disposed along an outer surface of the sleeve 205 and an outer surface press fit along a second radial face of the first seal housing 556*a*. A first longitudinal end of the first bushing 558*a* abuts a longitudinal shoulder of the first seal housing 556*a*. The first bushing 558*a* has two radial holes formed through a wall thereof. The holes are in fluid communication with two radial holes formed through a wall of the first seal housing 556*a*. A second longitudinal end of the first bushing 558*a* abuts a first longitudinal end of the second stator seal 555*b*. A recess is formed in an outer surface of the first seal housing 556*a* to serve as a lubricant chamber. A second longitudinal end of the first seal housing 556*a* abuts a first longitudinal face of the second seal housing 556*b* and a first longitudinal end of the second stator seal 555*b*.

An outer surface of the second seal housing 556b is disposed along an inner surface of the housing 530. A first radial face of the second seal housing 556b is press fit with a fourth radial face of the first seal housing 556a. The second stator seal 555b lip extends into a groove formed in the first longitudinal face of the second seal housing 556b. Pressure acting on wings of the second stator seal 555b expands the wings radially outward into engagement with a first radial face of the second seal housing 556b and an outer surface of the sleeve 205. A second longitudinal end of the second stator seal 555b proximally faces a second longitudinal face of the second seal housing 556b. An O-ring assembly 522 is disposed in a groove formed in an inner surface of the second seal housing 556b and the o-ring seal of the assembly 522 engages an inner surface of the housing 530.

The second bushing 558b is an annular member having an outer surface press fit along a second radial face of the second seal housing 556b and an inner surface proximally facing the outer surface of the sleeve 205. The second bushing 558b is made from a metal or alloy, such as aluminum or bronze. A first longitudinal end of the second bushing 558b proximally faces a third longitudinal face of the second seal housing 556b. One or more pins 559 are press fit into one or more holes formed in a second longitudinal end of the second seal housing 556b. The pins 559 are received in one or more corresponding holes formed in a second longitudinal shoulder of the housing 530, thereby rotationally coupling the second seal housing 556b to the housing 530.

The rotor seal 560 is an annular member having a straight longitudinal portion near a first longitudinal end thereof and a tapered longitudinal portion near a second longitudinal end thereof. The tapered longitudinal portion tapers outwardly from a first longitudinal end of the tapered portion near a first longitudinal end of the rotor seal 560 toward a second longitudinal end of the tapered portion near a second longitudinal end of the rotor seal 560. An inner surface of the rotor seal 560 is disposed along an outer surface of the sleeve 205. At least a portion of the tapered portion of the inner surface engages the outer surface of the sleeve 205. The first longitudinal end of the rotor seal 560 proximally faces a first radial face of the second bushing 558b. An outer surface of the rotor seal 560 proximally faces an inner surface of the second bushing 558b. The second longitudinal end of the rotor seal 560 proximally faces a second radial face of the second bushing 558b. The first longitudinal end of the rotor seal 560 is concave and the second longitudinal end of the rotor seal 560 is convex.

Figure 6:
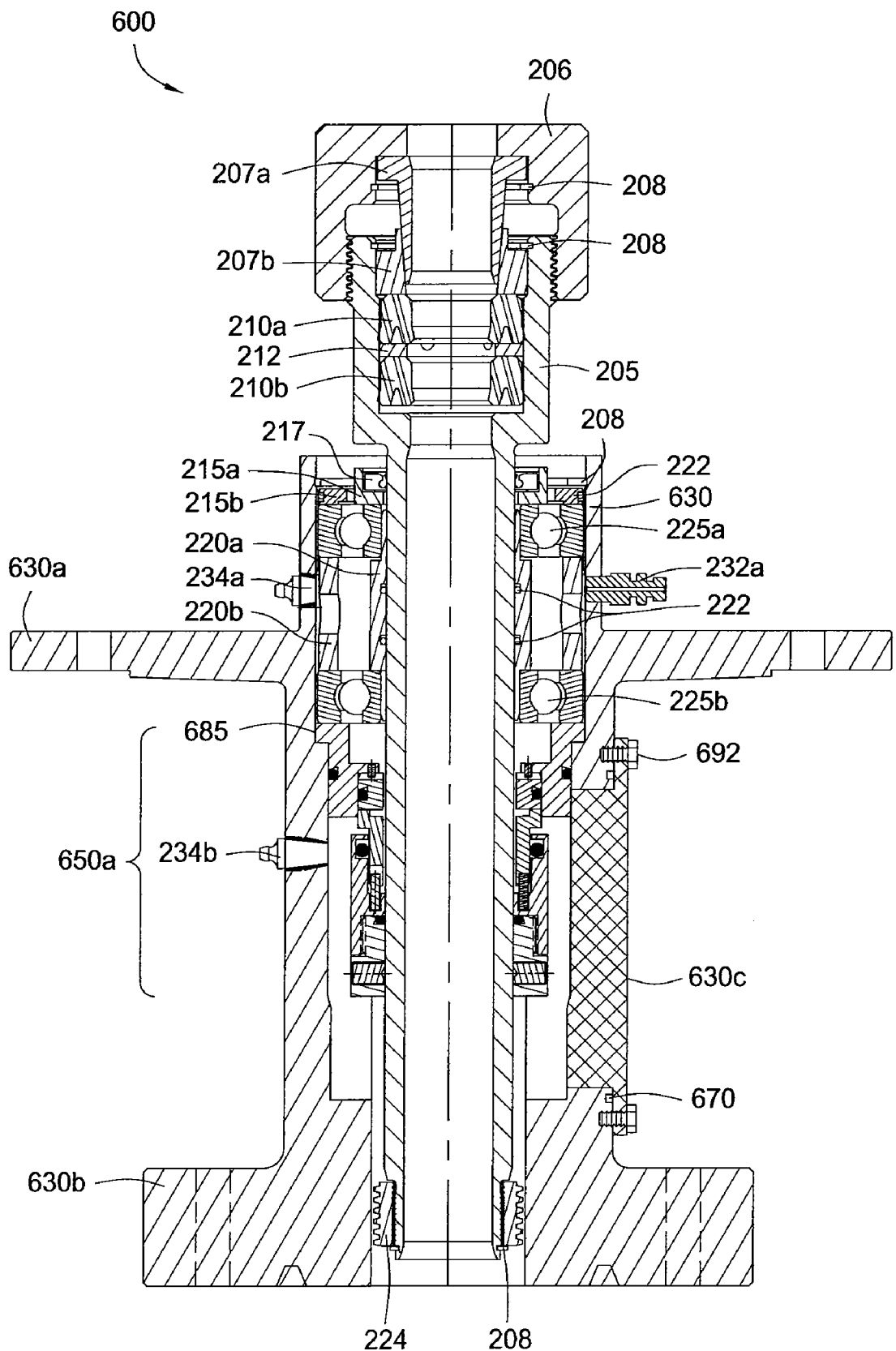
FIG. 6 is a sectional view of a retrofit stuffing box for a PC pump system, according to another embodiment of the present invention.

FIG. 6 is a sectional view of a retrofit stuffing box 600 for a PC pump system, according to another embodiment of the present invention. Like numbered members are identical to those of FIG. 2 and will not be discussed again. The stuffing box 600 may replace the stuffing box 16r and be used with the PC pump system 10 of FIG. 1. The housing assembly includes a housing 630 and an access panel 630c. The housing 630 is a tubular or annular member having a longitudinal bore therethrough and has a first flange 630a and a second flange 630b formed integrally therewith. Alternatively, the flanges 630a,b may be welded on the housing 630.

The access panel 630c is disposed in an access port formed in the housing 630. The access panel 630c is a semi-annular member or semi-tubular member. The access panel 630c is removably attached to the housing 630c with threaded fasteners 692. A gasket 670 seals an interface between the access panel 630c and the housing 630. The gasket 670 is made from a soft fibrous material or a soft metal. The mechanical seal assembly 650a is identical to the mechanical seal assembly 250a except that a modified stator mechanical seal housing 685 replaces the stator mechanical seal housing 285 and the o-ring 270 may replace the split o-ring 270a located in the outer surface of the modified stator mechanical seal housing 685. Alternatively, a similarly modified mechanical seal assembly 250b may be used instead. The modified stator mechanical seal housing 685 is an annular or tubular member and facilitates disassembly of the mechanical seal assembly 650a through the access port in the housing.

The stator mechanical seal housing 685, access panel 630c and access port allow removal and replacement of the seals 265b,c, 290b,c, and 270a,b (except for the o-ring 270/270a located in the outer surface of the stator mechanical seal housing 685) of the mechanical seal assembly 650a without having to disassemble the stuffing box 600 To accomplish this, the fasteners 692 would be removed. The access panel 630c would then be removed. The set screws 257 may then be loosened, and the rotor sub-assembly of the mechanical seal assembly 650a may be longitudinally slid away from the stator sub-assembly of the mechanical seal assembly 650a. The split mechanical seals 265b,c and 290b,c may then be removed. The o-ring 270b may then be removed and replaced. The stator mechanical seal housing 685 may have an access hole drilled through a wall thereof to allow a tool to be inserted to pry the stator mechanical seals 265b,c from the stator mechanical seal housing. The seal sleeve 260 may then be unscrewed from the seal retainer 255 in order to replace the o-ring 270a located in the longitudinal face of the seal retainer 255. The mechanical seal assembly 650a is now disassembled. The process may be reversed in order to install replacement mechanical seals 265b,c and 290b,c along with associated o-rings 270a.

The wall of the housing 630 proximate to the access port may be reinforced to allow the housing to sustain ordinary loading of a stuffing box housing. Alternatively, as discussed in relation to FIG. 2, seals 265, 290, and 270 could be initially installed in the mechanical seal assembly 650a and later replaced with seals 265b,c, 290b,c, and 270a,b.

At least some embodiments of the present invention allow the seals to be replaced at a lower elevation making the operation safer and the stuffing boxes 200-600 easier to reach. Using split seals makes the repair process more expedient, thereby returning the PC pump 34 to service sooner.

Alternatively, the split seal assemblies 250a, 250b, 450a, 650a may be used with other pumps and may be directly mounted on a pump shaft. Alternatively, any of the retrofit stuffing boxes 200-600 may be integral stuffing boxes.

While the foregoing is directed to embodiments of the present invention, other and further embodiments of the invention may be devised without departing from the basic scope thereof, and the scope thereof is determined by the claims that follow.

What is claimed is:

1. A stuffing box having a mechanical seal assembly for a pump, comprising:
    an outer housing having a longitudinal bore therethrough;
    a seal housing having a longitudinal bore therethrough, wherein the seal housing is disposed in the outer housing bore;
    first and second semi-annular mechanical seals, each at least partially disposed in the seal housing bore, and each having two radial faces, each radial face of each seal abutting a radial face of the other seal;
    a seal sleeve having a longitudinal bore therethrough and rotatable relative to the seal housing;
    third and fourth semi-annular mechanical seals, each at least partially disposed in the seal sleeve bore, each having two radial faces, each radial face of each seal abutting a radial face of the other seal, at least one of the third and fourth seals rotationally coupled to the seal sleeve but axially movable relative to the seal sleeve;
one or more biasing members biasing longitudinal faces of the third and fourth seals into engagement with longitudinal faces of the first and second seals; and
an internal sleeve that extends through the seal sleeve bore.

2. The stuffing box of claim 1, wherein the first and second semi-annular mechanical seals are each made from a material harder than ASTM A36 steel and the third and fourth semi-annular mechanical seals are each made from a material harder than ASTM A36 steel.

3. The stuffing box of claim 2, wherein the first and second semi-annular mechanical seals are each made from a ceramic material and the third and fourth semi-annular mechanical seals are each made from a ceramic material.

4. The stuffing box of claim 2, wherein the first and second semi-annular mechanical seals are each made from ceramic, metal, alloy, or carbon and the third and fourth semi-annular mechanical seals are each made from ceramic, metal, alloy, or carbon.

5. The stuffing box of claim 1, wherein at least one of the first and second semi-annular mechanical seals is rotationally coupled to the seal housing.

6. The stuffing box of claim 1, wherein the seal sleeve is disposed in the outer housing bore, or the seal housing is rotationally coupled to the outer housing.

7. The stuffing box of claim 6, wherein the seal sleeve is disposed in the outer housing bore.

8. The stuffing box of claim 6, wherein the internal sleeve is at least partially disposed in the outer housing bore and rotatable relative to the outer housing.

9. The stuffing box of claim 6, wherein the seal housing is disposed between the outer housing and the internal sleeve, the seal sleeve is disposed between the outer housing and the internal sleeve, and the seal sleeve is rotationally coupled to the internal sleeve.

10. The stuffing box of claim 6, further comprising:
an injectable seal assembly disposed in the outer housing bore, the injectable seal assembly comprising:
a first split annular injectable material retainer;
a second split annular injectable material retainer; and
a quantity of injectable sealing material disposed between the two injectable material retainers.

11. The stuffing box of claim 10, wherein the injectable sealing material is a mixture of grease or jelly and fibers.

12. The stuffing box of claim 6, wherein the seal housing is rotationally coupled to the outer housing.

13. The stuffing box of claim 6, wherein the internal sleeve is at least partially disposed in the outer housing bore and rotatable relative to the outer housing, and the seal sleeve is rotationally coupled to the internal sleeve.

14. The stuffing box of claim 13, wherein the seal housing is disposed between the outer housing and the internal sleeve and the seal sleeve is disposed between the outer housing and the internal sleeve.

15. The stuffing box of claim 6, further comprising a bearing disposed between the internal sleeve and the outer housing to facilitate rotation of the internal sleeve within the outer housing.

16. The stuffing box of claim 6, further comprising bearings positioned in an annular space between the internal sleeve and the outer housing, such that the internal sleeve is journalled for rotation within the outer housing.

17. The stuffing box of claim 6, further comprising static seals positioned within the internal sleeve, the static seals being adapted to engage a rod.

18. A progressive cavity pump (PCP) system, comprising:
the stuffing box of claim 1, wherein the outer housing is attached to a wellhead;
a drive string disposed through the stuffing box, wherein the internal sleeve is rotationally coupled to the drive string; and
a PC pump disposed in a wellbore extending from the wellhead, a rotor of the PC pump rotationally coupled to the drive string.

19. The progressive cavity pump (PCP) system of claim 18, wherein the stuffing box further comprises a bearing disposed between the internal sleeve and the outer housing to facilitate rotation of the internal sleeve within the outer housing.

20. The stuffing box of claim 1, further comprising:
a second outer housing having a longitudinal bore therethrough; wherein the outer housing includes second and third semi-annular outer housings, each having two radial faces, each radial face of each housing abutting a radial face of the other housing, the second and third semi-annular outer housings together forming the longitudinal bore therethrough, the second and third semi-annular outer housings rotationally coupled to the second outer housing and abutting a longitudinal end of the second outer housing, and wherein:
the seal housing is disposed in the longitudinal bore of the outer housing,
at least one of the first and second semi-annular mechanical seals is rotationally coupled to the seal housing; and
the seal sleeve is disposed in the longitudinal bore of the outer housing.

21. A progressive cavity pump (PCP) system, comprising:
the stuffing box of claim 20, wherein the outer housings are attached to a wellhead;
a drive string disposed through the stuffing box, wherein the internal sleeve is rotationally coupled to the drive string;
a PC pump disposed in a wellbore extending from the wellhead, a rotor of the PC pump rotationally coupled to the drive string.

22. The stuffing box of claim 20, further comprising a secondary seal assembly disposed in the second outer housing bore.

23. The stuffing box of claim 22, wherein the secondary seal assembly comprises:
an injectable seal assembly, comprising:
a first split annular injectable material retainer;
a second split annular injectable material retainer; and
a quantity of injectable sealing material disposed between the two injectable material retainers.

24. The stuffing box of claim 23, wherein the injectable sealing material is a mixture of grease or jelly and fibers.

25. The stuffing box of claim 1,
wherein the outer housing includes an access port disposed through a wall thereof;
a semi-annular access panel disposed in the access port and attached to the outer housing, wherein the first, second, third, and fourth semi-annular mechanical seals are located proximate to the access port.

26. A progressive cavity pump (PCP) system, comprising:
the stuffing box of claim 25, wherein the outer housing is attached to a wellhead;
a drive string disposed through the stuffing box, wherein the internal sleeve is rotationally coupled to the drive string;
a PC pump disposed in a wellbore extending from the wellhead, a rotor of the PC pump rotationally coupled to the drive string.

27. A method of performing maintenance on a stuffing box, comprising:
provided the stuffing box of claim 25;
removing the access panel from the outer housing;
separating the seal sleeve from the seal housing;
removing and replacing the first, second, third and fourth semi-annular mechanical seals; and
attaching the access panel to the outer housing.

28. The stuffing box of claim 1, wherein the seal housing comprises first and second semi-annular seal housings, each having two radial faces, each radial face of each seal housing abutting a radial face of the other seal housing, the seal housings together forming the longitudinal bore therethrough.

29. The stuffing box of claim 28, further comprising:
a second outer housing having a longitudinal bore therethrough,
wherein:
each seal housing has first and second longitudinal ends,
the first longitudinal ends abuts a longitudinal end of the outer housing,
the second longitudinal end abuts a longitudinal end of the second outer housing.

30. A progressive cavity pump (PCP) system, comprising:
the stuffing box of claim 29, wherein the outer housings are attached to a wellhead;
a drive string disposed through the stuffing box, wherein the internal sleeve is rotationally coupled to the drive string;
a PC pump disposed in a wellbore extending from the wellhead, a rotor of the PC pump rotationally coupled to the drive string.

31. A method of performing maintenance on the stuffing box of claim 29, comprising:
separating the outer housings from the seal housings;
separating the seal housings;
removing and replacing the first, second, third, and fourth semi-annular mechanical seals; and
re-assembling the stuffing box.

32. The method of claim 31, wherein the outer housings are separated from the seal housings by placing jacks between the two outer housings and lifting the second outer housing from the seal housings using the jacks.

33. A method of assembling the stuffing box of claim 1, comprising:
providing the stuffing box of claim 1;
removing the first, second, third, and fourth semi-annular mechanical seals from the stuffing box by separating them from each other into one or more pieces; and
installing new first, second, third, and fourth semi-annular mechanical seals into the stuffing box.

34. The method of claim 33, wherein the seal housing is disposed between the outer housing and the internal sleeve.

35. The stuffing box of claim 1, wherein the seal sleeve comprises first and second semi-annular seal sleeves, each having two radial faces, each radial face of each seal sleeve abutting a radial face of the other seal sleeve, the seal sleeves together forming the longitudinal bore therethrough.

* * * * *